United States Patent
Li

(10) Patent No.: US 8,823,827 B1
(45) Date of Patent: *Sep. 2, 2014

(54) REDUCING OPTICAL CROSSTALK AND RADIAL FALL-OFF IN IMAGING SENSORS

(71) Applicant: Marvell International Ltd., Hamilton (BM)

(72) Inventor: Hongxin Li, Shanghai (CN)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/921,729

(22) Filed: Jun. 19, 2013

Related U.S. Application Data

(63) Continuation of application No. 12/481,974, filed on Jun. 10, 2009, now Pat. No. 8,471,921.

(60) Provisional application No. 61/074,890, filed on Jun. 23, 2008.

(51) Int. Cl.
*H04N 5/228* (2006.01)

(52) U.S. Cl.
USPC ........................................ 348/222.1; 348/242

(58) Field of Classification Search
USPC ............................................ 348/207.99–376
See application file for complete search history.

(56) References Cited

U.S. PATENT DOCUMENTS

| | | |
|---|---|---|
| 2004/0257454 A1 | 12/2004 | Pinto et al. |
| 2006/0083432 A1 * | 4/2006 | Malvar ........................... 382/232 |
| 2007/0024720 A1 * | 2/2007 | Awazu ........................ 348/223.1 |
| 2007/0091338 A1 | 4/2007 | Asada |
| 2008/0101690 A1 | 5/2008 | Hsu et al. |
| 2008/0259180 A1 | 10/2008 | Ovsiannikov |
| 2008/0266413 A1 | 10/2008 | Cohen et al. |
| 2008/0279471 A1 * | 11/2008 | Hunter ........................... 382/260 |
| 2009/0027727 A1 | 1/2009 | Ovsiannikov |
| 2011/0058072 A1 * | 3/2011 | Wang et al. ................... 348/242 |

OTHER PUBLICATIONS

Finlayson et al. "Spectral sharpening: sensor transformations for improved color constancy", vol. 11, No. 5/May 1994/J. Optical Society of America.*

Finlayson et al., "Spectral sharpening: sensor transformations for improved color constancy," vol. 11, No. 5, May 1994, J. Optical Society of America.

* cited by examiner

*Primary Examiner* — Roberto Velez
*Assistant Examiner* — Yih-Sien Kao

(57) ABSTRACT

An imaging device and an image crosstalk analysis device are described that may be used to reduce optical crosstalk and radial fall-off in image data. The imaging device may include an image processing unit that applies corrections to the raw image data using newly developed correction algorithms and correction parameters that are generated for the imaging device by the image crosstalk analysis device based on an analysis of uncorrected image data generated by the imaging device. The correction parameters generated for a single imaging device may be loaded to imaging devices of the same make and model as part of the imaging device manufacturing process. Due to the flexible nature of the described processing techniques in which the control parameters are used, improved image quality may be achieved in every image generated by the respective manufactured cameras.

20 Claims, 10 Drawing Sheets

REDUCING OPTICAL CROSSTALK AND RADIAL FALL-OFF IN IMAGING SENSORS

INCORPORATION BY REFERENCE

This application is a continuation of U.S. application Ser. No. 12/481,974, filed on Jun. 10, 2009, which claims the benefit of U.S. Provisional Application No. 61/074,890, filed on Jun. 23, 2008. The disclosures of the applications referenced above are incorporated herein by reference in their entireties.

BACKGROUND

Raw digital images generated by imaging devices, e.g., digital cameras, that use sensor arrays, such as a complementary metal oxide semiconductor (CMOS) sensor arrays, may be degraded by one or more types of distortion. The distortions can include, for example, spectral crosstalk, electrical crosstalk, optical crosstalk, and sensor shading.

Spectral crosstalk may be caused by imperfect color filters that pass some amount of unwanted light of other colors. Spectral crosstalk may cause colors in a generated image to be unsaturated as compared to the color of the originally photographed object or scene. One approach for correcting spectral crosstalk is to apply a color correction matrix to the raw image data that compensates for the spectral crosstalk.

Electrical crosstalk may result from photo-generated carriers within the sensor array of the imaging device moving to neighboring charge accumulation sites, i.e., neighboring sensors within the sensor array. Electrical crosstalk is a function of the underlying sensor images that form the sensor array of the imaging device. As a result, the distortion caused by electrical crosstalk is uniform across the entire image. One approach for correcting electrical crosstalk is to apply a predetermined correction factor to each sensor response value included in the raw image data.

Optical crosstalk is the result of more complex origins. As described in greater detail below, color filters included in the optical sensor unit of an imaging device are placed some distance from the pixel surface due to metal and insulation layers. As a result, light coming at angles other than orthogonal may pass through a color filter element for a pixel, yet may pass diagonally to an adjacent pixel sensor rather than to the pixel sensor associated with the color filter element through which the light passed. Depending on the focal ratio of the lens, the portion of the light absorbed by neighboring pixel can vary significantly. For this reason, optical sensor units may include an array of micro-lenses layered over the array of color filter elements in order to redirect the light in the direction of the intended pixel sensor. However, longer wavelengths, e.g., red light, are more difficult to bend than shorter wavelengths of light, e.g., blue light, so optical crosstalk may occur despite the use of such micro-lenses.

The level of the optical crosstalk depends on the wavelength of light and the angle of incidence on the light on the individual pixels of the sensor array. Since the angle of incidence is related to pixel position, optical crosstalk is non-uniform for the whole image. Blue light is more easily bent by a micro lens and, therefore, is efficiently directed onto the sensor at the bottom of the pixel, while red light is not easily bent by a micro lens and, therefore, may leak to adjacent pixels. As light travels from a center focused lens onto the sensors in a sensor array, the angle of incidence of light on the respective pixels increases with the distance of the pixel from the center of the image, thereby increasing likelihood that light with longer wavelengths may fall onto an adjacent pixel's sensor.

As a result of optical crosstalk, the center of an image may appear brighter and redder and the surrounding portions of the image may appear darker and bluer. Although optical crosstalk may be partially corrected for using existing optical crosstalk correction, such techniques are often inadequate.

Sensor shading is the result of pixels closer to the center of an image shading pixels further from the center of the image. As described above with respect to optical crosstalk, color filters included in the optical sensor unit of an imaging device are placed some distance from the pixel sensors due to metal and insulation layers. As a result, light coming at angles other than orthogonal may be shaded from reaching its intended pixel by the metal and insulation layers above pixels closer to the center of the image. Further, lens shading is caused by the physical dimensions of a multiple element lens. Rear elements are shaded by elements in front of them, which reduces the effective lens opening for off-axis incident light. The result is a gradual decrease of the light intensity towards the image periphery. Although sensor shading and lens shading are not wavelength dependent, as is optical crosstalk, such sensor shading results in a similar form of radially increasing distortion, i.e., radial fall-off, by decreasing the amount of light reaching the pixels in the sensor array at locations further from the center of the image.

As a result of the combined effects of optical crosstalk and shading, pixels at the center of an image will experience minimal or no leakage and shading, but pixels further from the center of an image will experience increasing levels of leakage, especially for red pixels, and increasing levels of shading.

SUMMARY

Aspects of this disclosure describe an imaging device and an image crosstalk analysis device that may be used to reduce the effects of optical crosstalk and radial fall-off in image data.

The described imaging device may include an image processing unit that may correct for electrical crosstalk, spectral crosstalk, optical crosstalk and/or radial fall-off in both RGB and Bayer space formatted image data. The image processing unit may apply corrections to the raw image data using generalized correction algorithms that may be tailored to the image correction needs of the imaging device with a plurality of correction parameters. Such correction parameters may be generated and loaded to the imaging device based on an analysis performed using the described image crosstalk analysis device.

The described image crosstalk analysis device may be used to analyze images generated by an imaging device. The image crosstalk analysis device may generate correction parameters that, when used in conjunction with the described processing techniques, may be used to correct electrical crosstalk, spectral crosstalk, optical crosstalk and/or radial fall-off in future image data generated by the imaging device. The correction parameters may be uploaded to the imaging device and used to correct raw image data in the imaging device itself, and/or may be retained within the image crosstalk analysis device for use in correcting future images generated by the imaging device using the image crosstalk analysis device.

Depending on the uniformity with which the optical sensing units of the respective imaging devices are manufactured, once correction parameters are generated for a single representative imaging device, the same correction parameters may be loaded to imaging devices of the same make and model as part of the imaging device manufacturing process. Due to the flexible nature of the described processing techniques in which the control parameters are used, improved image quality may be achieved in every image generated by the respective manufactured imaging device.

In one example embodiment an imaging device is described that may include, an optical sensing unit that may generate image data containing a plurality of color channels, a data storage unit that may store the generated image data and a plurality of image correction parameters, and an image processing unit that may process the stored image data color channels to remove optical crosstalk and radial fall-off distortion based on the stored image correction parameters.

In a second example embodiment an image analysis device is described that may include, a sharpening matrix generation unit that may generate a sensor sharpening matrix that sharpens the effective sensor response of a color channel in an image, and a radial fall-off curve generation unit that may generate a set of radial fall-off correction parameters that may correct optical cross-talk and radial-falloff in the color channel in the image.

In a third example embodiment, a method of correcting optical crosstalk and radial fall-off distortion in image data is described that may include, receiving a set of image correction parameters, generating image data containing a plurality of color channels, storing the generated image data and image correction parameters, and processing the stored image data color channels to remove optical crosstalk and radial fall-off distortion based on the stored image correction parameters.

BRIEF DESCRIPTION OF THE DRAWINGS

Example embodiments of an imaging device and an image crosstalk analysis device that may be used to reduce optical crosstalk and radial fall-off for CMOS sensors will be described with reference to the following drawings, wherein like numerals designate like elements, and wherein.

DETAILED DESCRIPTION OF EMBODIMENTS

Figure 1:
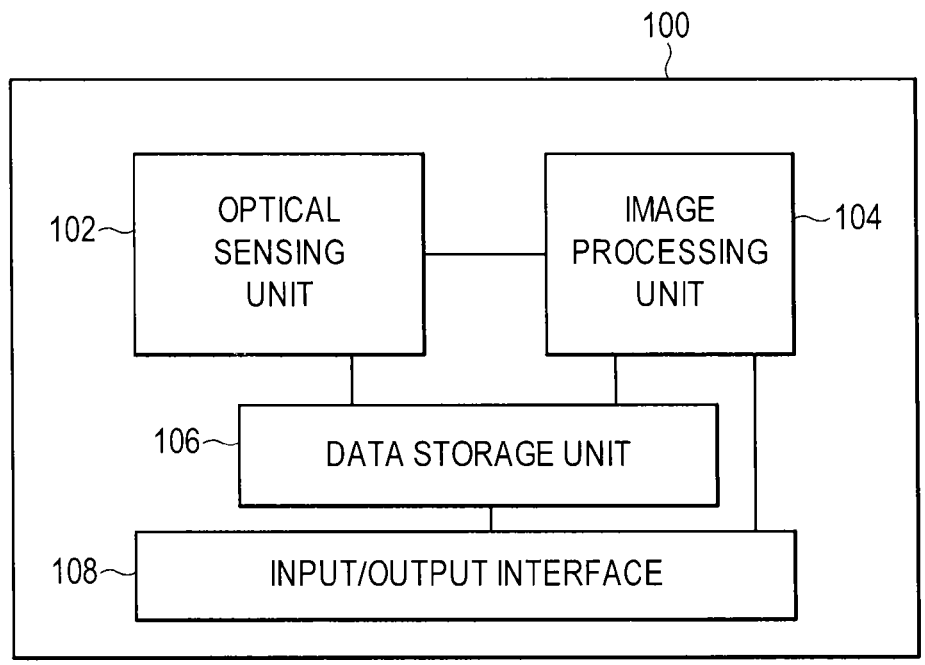
FIG. 1 is a block diagram of an example imaging device that includes an image processing unit that may reduce optical crosstalk and radial fall-off in generated images.

FIG. 1 is a block diagram of an example imaging device that includes an image processing unit that may process raw image data generated by an array sensor unit, e.g., a CMOS array sensor unit, to reduce optical crosstalk and radial fall-off in generated images. Embodiments of the example imaging device, shown in FIG. 1, may be included in stand-alone digital image cameras, as well as in digital image cameras embedded in other electronic devices, such as cellular phones, laptop computers and hand-held personal computing devices. As shown in FIG. 1, example imaging device 100 may include an optical sensing unit 102, an image processing unit 104, a data storage unit 106 and an input/output interface 108.

Figure 2:
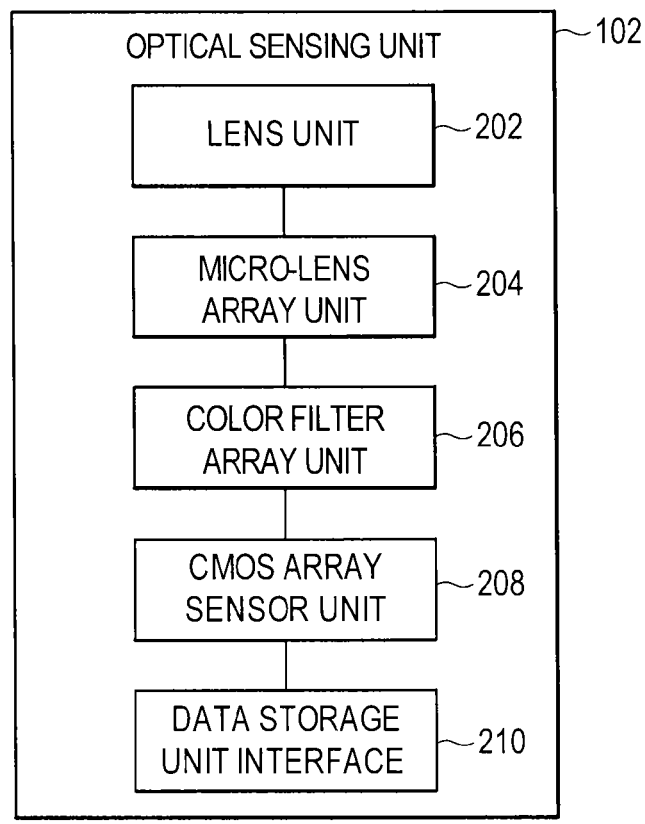
FIG. 2 is a block diagram of an example optical sensing unit introduced in FIG. 1.

FIG. 2 is a block diagram of an example embodiment of optical sensing unit 102, as shown in FIG. 1. As shown in FIG. 2, an example embodiment of optical sensing unit 102 may include a lens unit 202, a micro-lens array unit 204, a color filter array unit 206, a CMOS array sensor unit 208 and a data storage unit interface 210. In one example embodiment, the micro-lens array unit 204, color filter array unit 206, and CMOS array sensor unit 208 may be formed as successive layers in a single integrated device in which a single micro-lens of micro-lens array unit 204 is aligned with a single color filter element of color filter array unit 206, which is aligned with a single sensor of CMOS sensor array unit 208, as described below in greater detail with respect to FIG. 9.

For example, lens unit 202 may contain one or more fixed and/or adjustable focal length lenses capable of receiving light reflected from an object or scene to be photographed and focusing the light onto micro-lens array unit 204. Micro-lens array unit 204 may contain an array of micro-lenses, each respective micro-lens configured to receive and direct unfiltered light from lens unit 202 in the direction of a single colored filter element of color filter array unit 206 and a single CMOS array sensor of CMOS array sensor unit 208. Color filter array unit 206 may contain an array of colored filter elements, e.g., an array of red, green and blue filter elements, each individual color element in the array aligned with a single micro-lens of micro-lens array unit 204, so that light from a micro-lens is filtered by a single colored filter element before being passed, ideally, to a single intended CMOS array sensor of CMOS array sensor unit 208. CMOS array sensor unit 208 may include an array of CMOS light sensors, each sensor aligned with a colored filter element of color filter array unit 206 and capable of generating an electrical response signal that corresponds with the intensity of filtered light incident on the CMOS sensor.

In operation, light incident on an individual micro-lens of micro-lens array 204 may be directed through a single colored filter element of color filter array unit 206, so that, in the ideal case, only light having a wavelength passed by the single colored filter element is incident on a single intended CMOS sensor. One or more CMOS sensors may be associated with an image pixel. In one example embodiment, three individual CMOS sensors, each configured to receive light via red, green and blue color filter elements, respectively, may be associated with a single image pixel, thereby allowing the pixel to capture any color in the color spectrum based on the respective intensities of the respective red, green and blue primary color elements contributing to the pixel.

Electrical responses generated by the respective CMOS sensors in CMOS sensor array 208 may be formatted by data storage unit interface 210 and stored in data storage unit 106 as raw image data files. These raw image files may be retrieved via input/output interface 108 for viewing via a display integrated within the imaging device 100, or may be retrieved for transfer to another device, such as a personal computer, for long-term storage, viewing/printing and/or editing.

Figure 3:
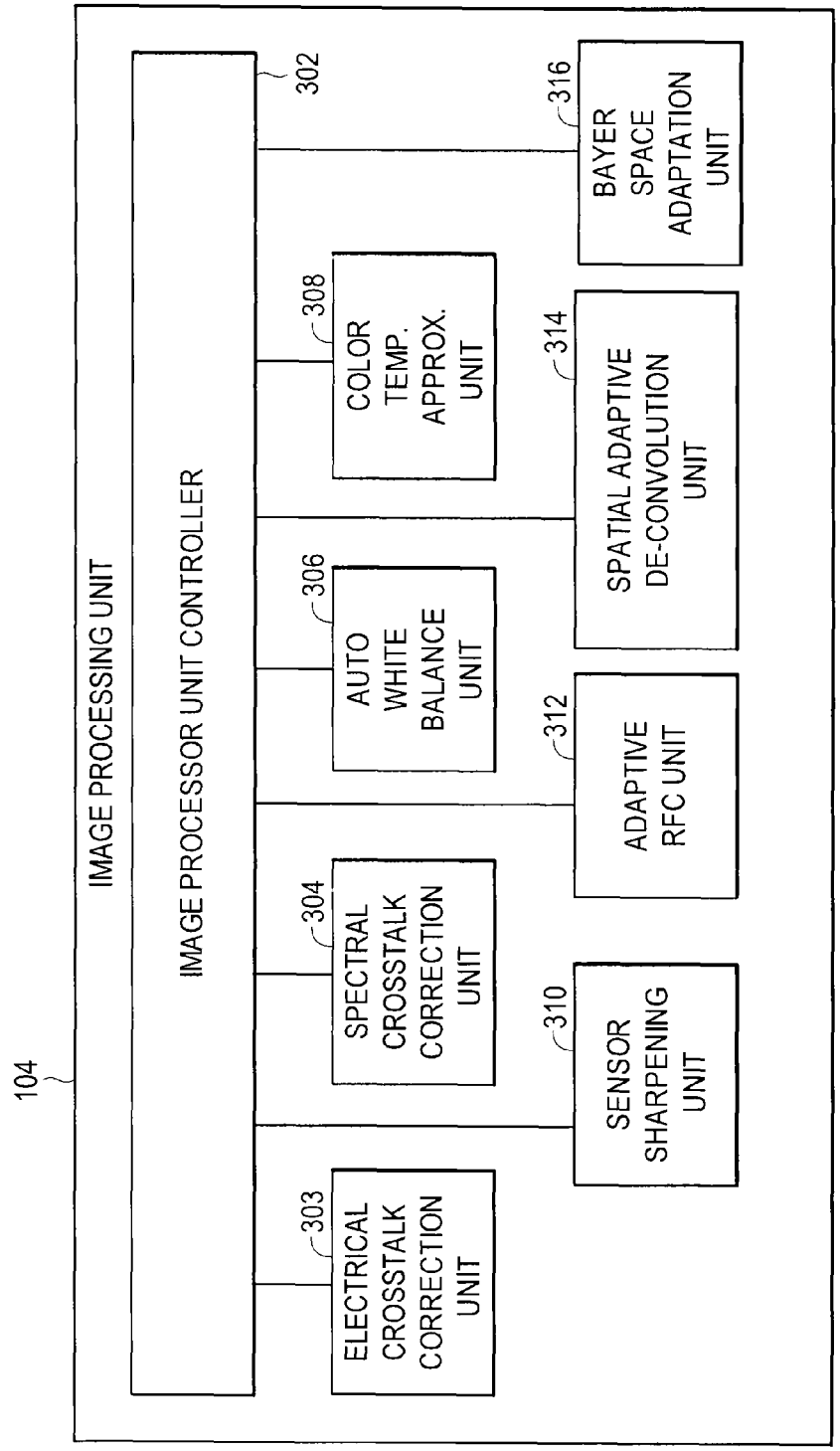
FIG. 3 is a block diagram of an example image processing unit introduced in FIG. 1.

FIG. 3 is a block diagram of an example embodiment of image processing unit 104. As shown in FIG. 3, image processing unit 104 may include, an image processor unit controller 302, an electrical crosstalk correction unit 303, a spectral crosstalk correction unit 304, an auto white balance unit 306, a color temperature approximation unit 308, a sensor sharpening unit 310, an adaptive radial fall-off curve unit 312, a spatial adaptive de-convolution unit 314 and a Bayer space adaptation unit 316. Raw image files may be retrieved by image processing unit 104 from data storage unit 106 for processing that reduces the effect of electrical crosstalk, spectral crosstalk, optical crosstalk and/or radial fall-off errors in the raw image data. The revised image data may then again be stored to data storage unit 106.

In operation, image processor unit controller 302 may maintain a workflow state machine, and/or control parameters that allow each of the respective units described below to perform its assigned task. For example, image processor unit controller 302 may maintain a status list of which raw image data files stored in data storage unit 106 have been processed to reduce the effect of electrical crosstalk, spectral crosstalk, optical crosstalk and/or radial fall-off errors in the raw image data. Further, as raw data associated with each image is processed by the respective units described below, image processor unit controller 302 may receive status updates from the respective units so that image processor unit controller 302 may coordinate the actions of the respective units in performing subsequent processing of the image data.

Example processes that may be executed by/coordinated by image processor unit controller 302 to reduce the effect of optical crosstalk and/or radial fall-off errors in the raw image data are described below with respect to FIG. 7 and FIG. 8. The individual roles of the processing units shown in FIG. 3 with respect to those processes are described below.

Electrical crosstalk correction unit 303 may correct electrical crosstalk in raw image data by applying one or more predetermined electrical crosstalk correction parameters to the stored image data sensor responses. As described above, electrical crosstalk results from photo-generated carriers having the possibility to move to neighboring charge accumulation sites and is uniform across the entire image. Therefore, at the request of image processor unit controller 302, electrical crosstalk correction unit 303 may apply one or more predetermined electrical crosstalk correction parameters to the stored image data retrieved by image processor unit controller 302. The predetermined electrical crosstalk correction parameters may be determined using an example embodiment of an image crosstalk analysis device, as described below with respect to FIG. 5.

Spectral crosstalk correction unit 304 may correct spectral crosstalk in raw image data by applying a predetermined color correction matrix to the RGB triads of each pixel in raw image data. As described above, spectral crosstalk may be due to imperfect color filter elements within color filter array unit 206 passing through some amount of unwanted wavelengths of light other than those wavelengths the filter is intended to pass. Spectral crosstalk may cause the colors associated with the raw image data to be unsaturated. Fortunately, spectral crosstalk is consistent across images for the respective colors and may be corrected by applying color corrections based on a predetermined color correction matrix. Therefore, at the request of image processor unit controller 302, spectral crosstalk correction unit 304 may apply a color correction matrix to a current set of raw image data retrieved by image processor unit controller 302. The predetermined color correction matrix may be determined using an example embodiment of an image crosstalk analysis device, as described below with respect to FIG. 5.

Auto white balance unit 306 may be used to identify a set of color temperatures within image data. For example, auto white balance unit 306 may automatically calculate the best white balance values according to the lighting conditions identified by the imaging device user, e.g., via a setting or selection via a user interface supported by the imaging device. Once a correct white balance is applied, auto white balance unit 306 may identify a set of color temperatures in the auto white balanced image data.

Color temperature approximation unit 308 may be used to match each color temperature identified by auto white balance unit 306 within an image to a closest approximate temperature for which a predetermined sharpening matrix and adaptive radial fall-off coefficients, and/or special adaptive de-convolution kernel coefficients have been generated and stored in data storage unit 106. Details related to the generation and use of predetermined sharpening matrix and adaptive radial fall-off coefficients, and/or special adaptive de-convolution kernel coefficients are described below with respect to FIG. 5, FIG. 6, FIG. 7 and FIG. 8, and with respect to equations 8, 33-34, 30, and 26, respectively.

Sensor sharpening unit 310 may be used to apply a predetermined sharpening matrix to a set of raw image data RGB pixel values to sharpen the effective sensor response, as described below with respect to FIG. 7 and FIG. 8, and with respect to equation 8. The predetermined sharpening matrix is developed for each of a selected set of color temperatures, as described below with respect to FIG. 5 and equations 33 and 34. A separate predetermined sharpening matrix may be applied to image data pixels for each color temperature identified within the image.

Adaptive radial fall-off unit 312 may be used to apply a predetermined set of adaptive radial fall-off curve coefficients to a set of sensor sharpened RGB pixel values to correct optical cross-talk and radial fall-off in the image data as described below with respect to FIG. 7 and FIG. 8, and with respect to equation 8. The predetermined adaptive radial falloff curve coefficients are developed for each of a selected set of color temperatures, as described below with respect to FIG. 5 and equation 30. A set of adaptive radial fall-off curve coefficients may be applied to a set of sensor sharpened RGB pixel values for each color temperature identified within the image.

Spatial adaptive de-convolution unit 314 can provide an alternate technique for correcting optical cross-talk and/or radial fall-off. A predetermined set of spatial adaptive de-convolution kernel coefficients may be applied to the raw image data in place of the sensor sharpening matrix and adaptive radial fall-off curve coefficients. For example, a predetermined set of spatial adaptive de-convolution kernel coefficients, described below with respect to equation 26, may be applied to the raw image data for each color temperature identified in the image, as described below with respect to FIG. 7 and equation 24. Such an alternate technique for correcting optical cross-talk and/or radial fall-off in image data is mathematically derived from the combination of linear form demosaicing and sensor response sharpening, and hence can operate on Bayer space directly. Furthermore, the de-convolution method is generalized by allowing more than 3 falloff curves instead of one falloff curve for each channel of RGB format image.

Bayer space adaptation unit 316 may be used to reduce the effect of spectral crosstalk, optical crosstalk and/or radial fall-off errors in the raw image data generated and stored in Bayer space format. As described in greater detail below, the sensor sharpening matrix, adaptive radial fall-off curve coefficients, and spatial adaptive de-convolution kernel coefficients are configured for application to RGB formatted image data. As described below with respect to FIG. 4, Bayer space adaptation unit 316 may provide additional processing capabilities to convert Bayer space formatted raw image from/to mosaic Bayer space formatted data to/from R, $G_1$, $G_2$, B formatted data so that Bayer space formatted image data may be processed using the above described sensor sharpening matrix, the adaptive radial fall-off curve coefficients, and/or the spatial adaptive de-convolution kernel coefficients, and then converted back to a Bayer space formatted image data.

Figure 4:
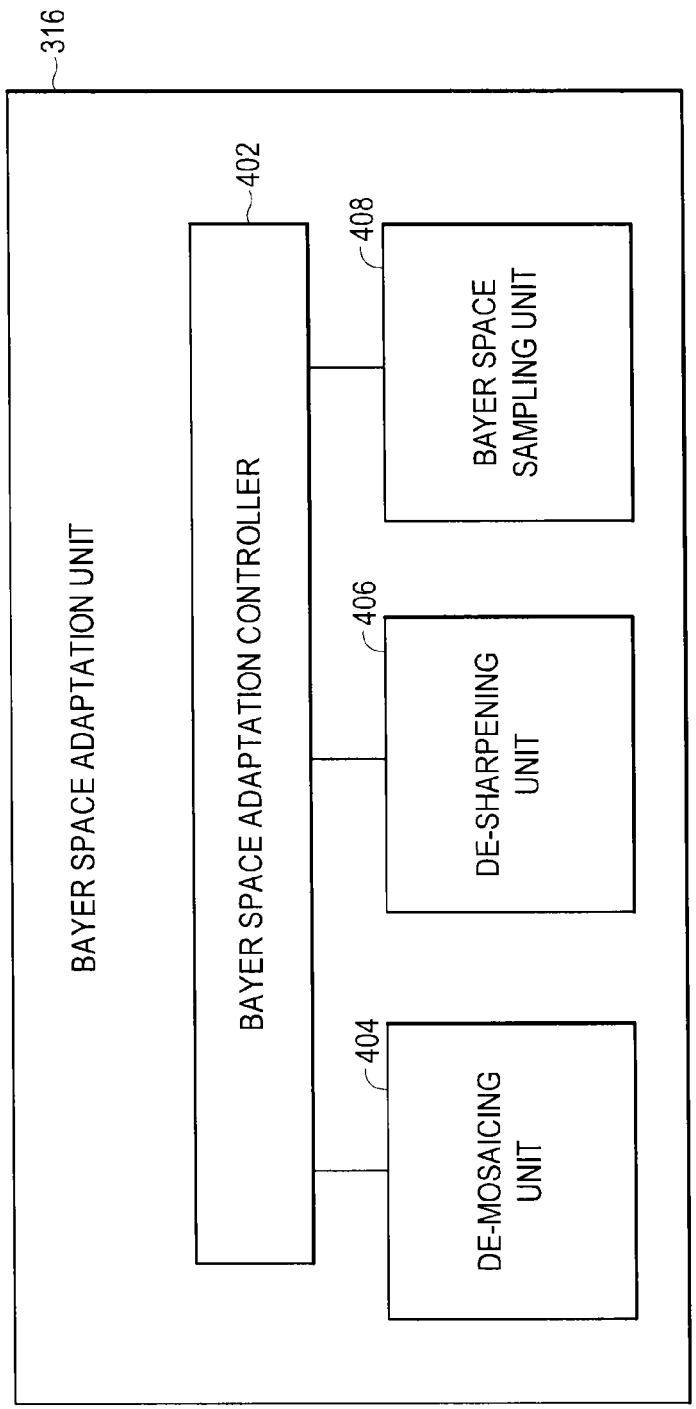
FIG. 4 is a block diagram of an example Bayer space adaptation unit introduced in FIG. 3.

FIG. 4 is a block diagram of an example embodiment of the Bayer space adaptation unit 316 described above with respect to FIG. 3. As shown in FIG. 4, an example embodiment of Bayer space adaptation unit 316 may include a Bayer space adaptation controller 402, a de-mosaicing unit 404, a de-sharpening unit 406 and Bayer space sampling unit 408.

Bayer space adaptation controller 402 may control operation of de-mosaicing unit 404 to convert image data from Bayer space format to R, $G_1$, $G_2$, B format, may coordinate with image processor unit controller 302 to coordinate use of electrical crosstalk correction unit 303, spectral crosstalk correction unit 304, auto white balance unit 306, color temperature approximation unit 308, sensor sharpening unit 310, adaptive radial fall-off curve unit 312, and spatial adaptive de-convolution unit 314, as needed, to reduce the effect of spectral crosstalk, optical crosstalk and/or radial fall-off errors in the raw image data, and then to coordinate use of de-sharpening unit 406 and Bayer sampling unit 408 to restore the revised image data to its original Bayer space format.

De-mosaicing unit 404 may be invoked by Bayer space adaptation controller 402 to reconstruct, or de-mosaic Bayer formatted image data. For example, de-mosaicing unit 404 may apply interpolation algorithms, such as bilinear interpolation, in which the red value of a non-red pixel is computed as the average of the two or four adjacent red pixels, and similarly for blue and green. Other linear or edge adaptive demosaicing techniques, such as bicubic interpolation, spline interpolation, Adam-Halmilton demosacing, and the like, may also be used.

De-sharpening unit 406 may be used to remove the sensor sharpening applied by sensor sharpening unit 310, once the effects of electrical crosstalk, spectral crosstalk, optical crosstalk and/or radial fall-off errors have been corrected for in the raw image data. For example, de-sharpening unit 406 may apply a de-sharpening matrix, i.e., the inverse matrix of the sensor spectrum response sharpening matrix, to remove the sensor sharpening applied by sensor sharpening unit 310. Unless de-sharpened, the sharpened R, G, B values may impact the edge detection of demosaicing algorithm and may result in an image with sharp edges and big noise, which may degrade image quality.

Bayer space sampling unit 408 may be used to sub-sample the de-sharpened R, G, B image data, in which the effects of electrical crosstalk, spectral crosstalk, optical crosstalk and/or radial fall-off errors have been corrected. In this manner, the corrected image data may be returned to the Bayer space format in which the image was originally stored in data storage unit 106.

Figure 5:
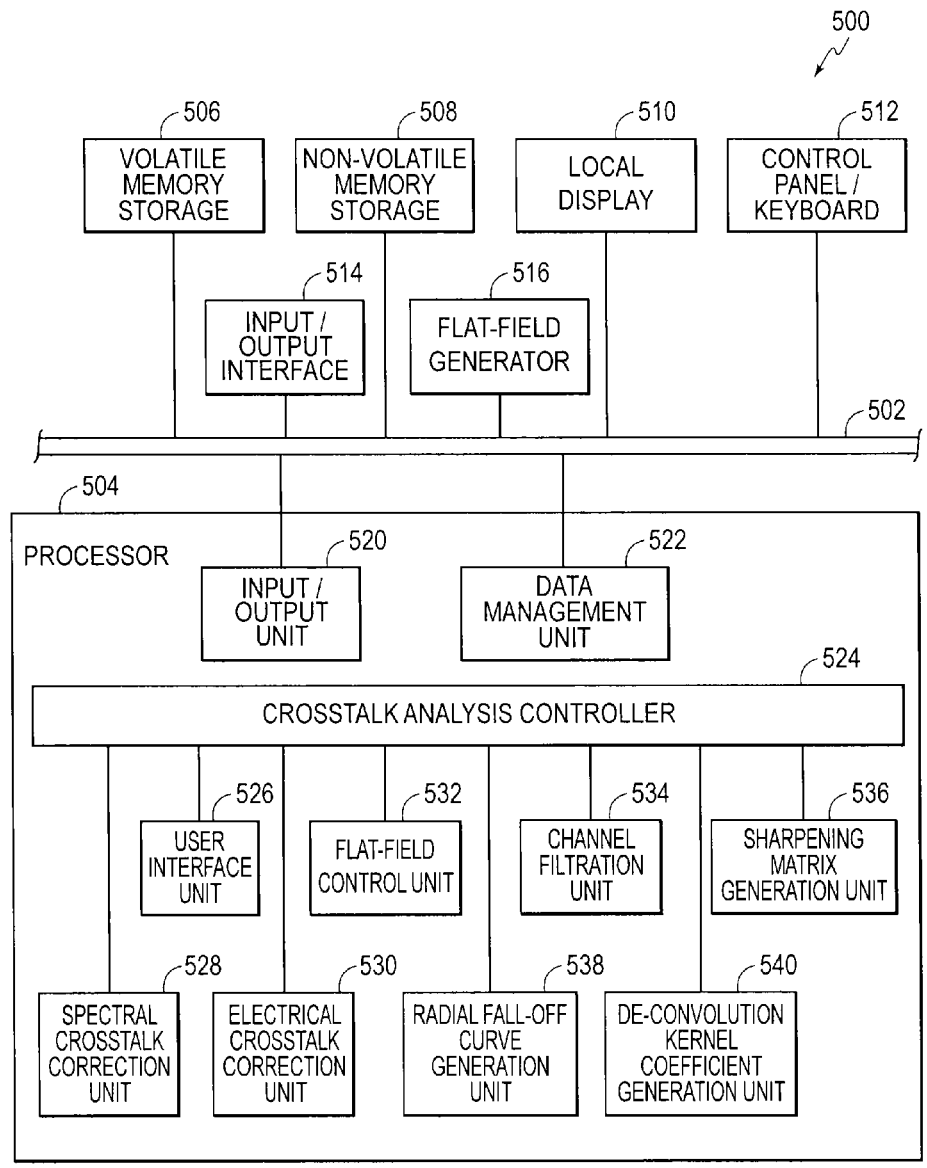
FIG. 5 is a block diagram of an example image crosstalk analysis device that may be used to analyze images generate by an example imaging device to facilitate a reduction of optical crosstalk and radial fall-off in images generated by the imaging device.

FIG. 5 is a block diagram of an example image crosstalk analysis device that may be used to analyze images generated by an example imaging device to facilitate a reduction of electrical crosstalk, spectral crosstalk, optical crosstalk, electrical crosstalk and/or radial fall-off in images generated by the imaging device. Image crosstalk analysis device may receive image data from an imaging device, e.g., via input/output interface 108 of example imaging device 100, as described above with respect to FIG. 1, and may analyze the image data to produce, for example, color correction tables, electrical crosstalk correction parameters, sharpening matrices, de-sharpening matrices, adaptive radial falloff curve correction parameters and/or spatial adaptive de-convolution kernel coefficients. The generated correction data may be transferred to and stored in data storage unit 106, e.g., via input/output interface 108 of example imaging device 100. As described below, image processing unit 104 may selectively retrieve and use the stored, color correction tables, electrical crosstalk correction parameters, sharpening matrices, de-sharpening matrices, adaptive radial falloff curve correction parameters and/or spatial adaptive de-convolution kernel coefficients to make corrections to a stored image generated by optical sensing unit 102.

As shown in FIG. 5, an example embodiment of image crosstalk analysis device 500 may include a computer system data bus 502 that allows a processor 504 to communicate with, and exchange information with hardware components of the image crosstalk analysis device such as: a volatile memory storage 506, which allows the processor 504 to store program instructions in local memory for execution and to store and maintain temporary data necessary for execution of the stored program instructions; a non-volatile memory storage 508, such as a hard-drive and/or firmware storage, which allows processor 504 to access, retrieve and/or store data and program instructions for later use/execution by the processor; a local display 510, which may support a visual interface with a crosstalk analysis technician, or user, who is responsible for assuring that generated crosstalk correction data files meet the user's expectation requirements; a control panel/keyboard 512, and/or a cursor control device that allow the processor to receive user instructions and/or information and/or feedback; an input/output interface 514 capable of supporting the receipt of image data files and image device description data from an imaging device, e.g., such as imaging device 100 described above with respect to FIG. 1, and capable of supporting the transfer of correction parameter data files generated by image crosstalk analysis device 500 to imaging device 100; and a flat-field generator capable of displaying flat field images corresponding to selected color temperatures that may be photographed by imaging device 100 to generate corresponding color temperature flat-field image data which may be transferred from imaging device 100 to image crosstalk analysis device 500 via input/output interface 514.

As further shown in FIG. 5, processor 504 may include internal components that allow processor 504 to communicate with the above-described hardware components to send and receive data and instructions over system bus 502. Such components may include: an input/output unit 520 that manages communication exchanges between processes executed by processor 504 and the system bus 502; and a data management unit 522, which allows processor 504 to maintain a local set of control parameters such as counters, pointers, and segments of executable program instructions for execution.

For example, when provided with executable instructions, processor 504 may, in accordance with instructions/commands received from a user via control panel/keyboard 512, retrieve and initiate control parameters/pointers for the execution of program instructions related to the creation of crosstalk correction data files for a specific imaging device 100. For example, at startup, processor 504 may retrieve and load program instructions from non-volatile memory storage 508 into volatile memory storage 506 for execution and may maintain control parameters in data management unit 522 for use in controlling the simultaneous and/or sequential execution of the program instructions retrieved for execution.

For example, as shown in FIG. 5, processor 504 may establish, based on stored program instructions retrieved for execution from non-volatile memory storage 508: a user interface unit 526 that supports a user interface between the image crosstalk analysis device and a crosstalk analysis technician, or user, via local display 510 and control panel/keyboard 512, e.g., to receive user commands and instructions for managing the creation of crosstalk correction data files for a specific imaging device; a crosstalk analysis controller 524 that coordinates the crosstalk analysis process and the generation of crosstalk correction data files for an imaging device; a spectral crosstalk correction unit 528 that supports the development of color correction tables to reduce the effect of spectral crosstalk in image data generated by an imaging device; an electrical crosstalk correction unit 530 that supports the development of a uniform correction for electrical crosstalk in image data generated by an imaging device; a flat-field control unit 532 that controls the generation of color temperature flat-field data files; a channel filtration unit 534 that filters noise and dark current from data image files received from an imaging device; a sharpening matrix generation unit 536 that supports generation of sensor sharpening matrices; a radial fall-off curve generation unit 538 that supports the generation of radial fall-off correction parameters; and a de-convolution kernel coefficient generation unit 540 that supports the generation of de-convolution kernel coefficients.

In operation, each of the above-described modules/controllers executed by processor 504 may maintain a workflow state machine, and/or control parameters that allow each module to perform its assigned task. For example, crosstalk analysis controller 524 may maintain a work-flow state machine, and/or control parameters that allows crosstalk analysis controller 524 to coordinate the functions performed by other units executed by processor 504 to perform crosstalk analysis and generate crosstalk correction data files for an imaging device.

For example, crosstalk analysis controller 524 may contain a set of control parameters that allows it to initiate the performance of specific actions by each of the other modules executed by processor 504. Each module executing an assigned task may provide crosstalk analysis controller 524 with status updates, e.g., indicating the completion of an assigned task, thereby allowing crosstalk analysis controller 524 to orchestrate activities performed by the respective modules/controllers in series and/or in parallel to expedite the smooth and efficient execution of a crosstalk analysis and crosstalk correction data generation session with a user.

User interface unit 526 may generate and present to a user via, for example, local display 510, displays that allow the user to interact with and control a crosstalk analysis and crosstalk correction data generation session. For example, at the start of a crosstalk analysis and crosstalk correction data generation session, a user may be presented with a display that allows the user to connect to an imaging device 100 that may be physically connected to image crosstalk analysis device 500, e.g., via input/output interface 514. Throughout the crosstalk analysis and crosstalk correction data generation session, user interface unit 526 may guide the user through the respective processes that require user input/feedback based on an overall process flow controlled by crosstalk analysis controller 524.

Electrical crosstalk correction unit 530 may generate electrical crosstalk correction parameters that maybe uploaded to imaging device 100 and applied by image processing unit 104 to future images generated by imaging device 100. As described above, electrical crosstalk results from photo-generated carriers having the possibility to move to neighboring charge accumulation sites and is uniform for the whole image. Electrical crosstalk correction unit 530 may compare pixel values from flat-field images generated by an imaging device, with a set of reference pixel values for reference flat-field images for the same respective color temperatures stored within non-volatile memory storage 508 and may generate one or more electrical crosstalk correction parameters for the imaging device. User interface unit 526 may be used to provide an opportunity to visually view comparisons of the imaging device's respective flat-field images with corresponding reference flat-field images both before and after application of the proposed electrical crosstalk correction parameters. The user may modify the one or more proposed electrical crosstalk correction parameters and repeatedly compare the effect of the one or more proposed/revised electrical crosstalk correction parameters on the respective imaging device flat-field images in comparison with the reference images until the user's image quality expectations are satisfied. Electrical crosstalk correction parameters approved by the user may be stored for subsequent upload to imaging device 100 for application by image processing unit 104 to future images generated by imaging device 100.

Spectral crosstalk correction unit 528 may generate color correction tables that maybe uploaded to imaging device 100 and applied by image processing unit 104 to future images generated by imaging device 100 to counter spectral crosstalk identified by spectral crosstalk correction unit 528 in flat-field images generated by imaging device 100. As described above, spectral crosstalk results from imperfect color filters passing through some amount of unwanted light of other colors and may cause unsaturated colors in a generated image. Spectral crosstalk may be corrected with one or more color correction matrices. Spectral crosstalk correction unit 528 may compare pixel values from flat-field images generated by imaging device 100, with a set of reference pixel values for reference flat-field images for the same respective color temperatures stored within non-volatile memory storage 508 and may generate one or more color correction tables for the imaging device. User interface unit 526 may be used to provide an opportunity to visually view comparisons of the imaging device's respective flat-field images with corresponding reference flat-field images both before and after application of the proposed color correction tables. The user may modify the one or more proposed color correction tables and repeatedly compare the effect of the one or more proposed/revised color correction tables on the respective imaging device flat-field images in comparison with the reference images until the user's image quality expectations are satisfied. Color correction tables approved by the user may be stored for subsequent upload to imaging device 100 for application by image processing unit 104 to future images generated by imaging device 100.

Flat-field control unit 532 may coordinate the generation of flat-field images for a set of color temperatures selected by image crosstalk analysis device 500 for use in a crosstalk analysis and crosstalk correction data generation session. For example, flat-field control unit 532, via crosstalk analysis controller 524 may instruct flat-field generator 516 to generate a series of flat-field images for a range of color temperatures. Upon presentation of each respective flat-field image, flat-field control unit 532, via crosstalk analysis controller 524 and input/output interface 514 may instruct imaging device 100 to photograph each respective flat-field image and transfer the generated flat-field image data to image crosstalk analysis device 500 for storage in association with the respective color temperature and a unique identifier/descriptor of the imaging device. These stored flat-field images maybe used to support subsequent crosstalk analysis and crosstalk correction data generation performed during the session, as described in greater detail below.

Channel filtration unit 534 may be configured to filter image data received by image crosstalk analysis device 500 and filter out noise and dark current, i.e., repetitive fixed pattern noise, detected in the image data. Such noise in the image data may be corrected with one or more digital filters and/or smoothing functions. Channel filtration unit 534 may compare pixel values from flat-field images generated by imaging device 100, with a set of reference pixel values for reference flat-field images for the same respective color temperatures stored within non-volatile memory storage 508 and may recommend one or more digital filters and/or smoothing functions. User interface unit 526 may be used to provide an opportunity to visually view comparisons of the imaging device's respective flat-field images with corresponding reference flat-field images both before and after application of the proposed digital filters and/or smoothing functions. The user may select one or more of the proposed digital filters and/or smoothing functions and repeatedly compare the effect of the one or more proposed digital filters and/or smoothing functions on the respective imaging device flat-field images in comparison with the reference images until the user's image quality expectations are satisfied. Digital filters and/or smoothing functions approved by the user may be stored for subsequent upload to imaging device 100 for application by image processing unit 104 to future images generated by imaging device 100.

Sharpening matrix generation unit 536 may generate, for each color temperature flat-field image generated for imaging device 100, a sharpening matrix as described in greater detail below with respect to equations 33 and 34. The generated sharpening matrices may be uploaded to imaging device 100 and may be applied by image processing unit 104 to future images generated by imaging device 100 as described above with respect to FIG. 3 and FIG. 4, and as described below with respect to FIG. 7 and FIG. 8.

Radial fall-off curve generation unit 538 may generate, for each color temperature flat-field image generated for imaging device 100, radial fall-off coefficients as described in greater detail below with respect to equation 30. The generated radial fall-off coefficients may be uploaded to imaging device 100 and may be applied by image processing unit 104 to future images generated by imaging device 100 as described above with respect to FIG. 3 and FIG. 4, and as described below with respect to FIG. 7 and FIG. 8.

De-convolution kernel coefficient generation unit 540 may generate, for each color temperature flat-field image generated for imaging device 100, de-convolution kernel coefficients, as described in greater detail below with respect to equation 26. The generated radial fall-off coefficients may be uploaded to imaging device 100 and may be applied by image processing unit 104 to future images generated by imaging device 100, as described below with respect to FIG. 7 and FIG. 8. De-convolution kernel coefficients may be applied to the respective color temperatures identified in an image to correct for optical crosstalk and radial falloff in an image generated by an imaging device which has been determined to have sufficiently sharp sensor sensitivity so as to not require use of a sharpening matrix. De-convolution kernel coefficients may be applied to image data for a color temperature in place of the sharpening matrix and radial fall-off curve coefficients. For example, user interface unit 526 may be used to provide a user with an opportunity to visually view comparisons of an image generated by an imaging device corrected with first the sharpening matrix and radial fall-off curve coefficients generated by sharpening matrix generation unit 536 and radial fall-off generation unit 538, respectively, followed by the same image corrected with de-convolution kernel coefficients generated by de-convolution kernel coefficient generation unit 540. In this manner, a user may select which approach is applied by imaging device 100 to future generated image data.

Figure 6:
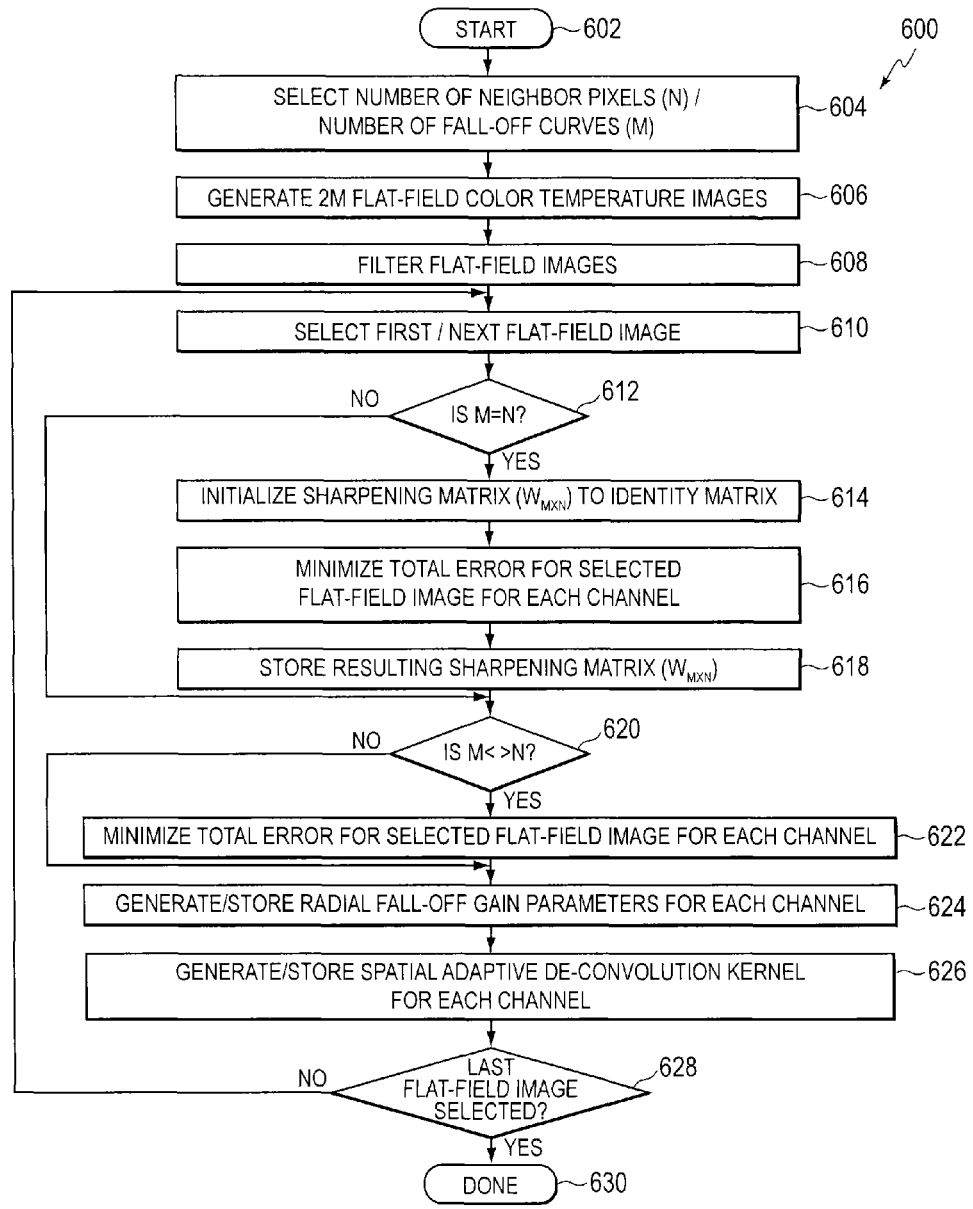
FIG. 6 shows a flow-chart of an example process that may be performed by an example image crosstalk analysis device of FIG. 5 to generate data parameters specific to an example imaging device that may be used to reduce optical crosstalk and radial fall-off in images generated by the imaging device.

FIG. 6 shows a flow-chart of an example process that may be performed by an example image crosstalk analysis device 500 of FIG. 5. The process may be used to generate correction parameters for imaging device 100, e.g., sharpening matrices, radial fall-off curve coefficients, and de-convolution kernel coefficients, that may be uploaded to imaging device 100 for application by image processing unit 104 to correct optical crosstalk and radial falloff in future images generated by imaging device 100. As shown in FIG. 6, operation of process 600 begins at step S602 and proceeds to step S604.

In step S604, crosstalk analysis controller 524 may select, e.g., based on technical description data received from an attached imaging device 100, such as CMOS sensor array density and/or raw image data format, a number of neighbor pixels (N) and a number of fall-off curves (M), and operation of the process continues to step S606.

In step S606, flat-field control unit 532 may coordinate the operation of flat-field generator 516 and imaging device 100 connected to image crosstalk analysis device 500 via input/output interface 514, as described above with respect to FIG. 5, to generate and download from imaging device 100 flat-field data images generated for a set of color temperatures, and operation of the process continues to step S608.

In step S608, channel filtration unit 534 maybe invoked to filter noise and dark current from the generated flat-field images, as described above with respect to FIG. 5, and operation of the process continues to step S610.

In step S610, crosstalk analysis controller 524 may select a first/next color temperature in the flat-field image generated and filtered in step S606 and step S608, respectively, and operation of the process continues to step S612.

In step S612, crosstalk analysis controller 524 determines if number of neighbor pixels (N) is equal to the number of fall-off curves (M). If so, operation of the process continues to step S614, otherwise, operation of the process continues to step S620.

In step S614, sharpening matrix generation unit 536 may initialize a sharpening matrix to the identity matrix, and operation of the process continues to step S616.

In step S616, sharpening matrix generation unit 536 may minimize the total error for pixels of the selected flat-field image for each channel, e.g., R, G, B, as described below with respect to equations 33 and 34, e.g., using a method of steepest gradient descent, resulting in the generation of a sharpening matrix $W_{M \times N}$, and operation of the process continues to step S618.

In step S618, the generated sharpening matrix $W_{M \times N}$ may be stored in association with the identifiers, e.g., make, model, and serial number, of the attached imaging device 100, and operation of the process continues to step S620.

In step S620, crosstalk analysis controller 524 determines if the number of neighbor pixels (N) is not equal to the number of fall-off curves (M). If so, then operation of the process continues to step S622; otherwise, operation of the process continues to step S624.

In step S622, sharpening matrix generation unit 536 may minimize the total error for pixels of the selected flat-field image for each channel, e.g., R, G, B, as described below with respect to equations 33 and 34, e.g., using a method of steepest gradient descent, resulting in the generation of a sharpening matrix $W_{M \times N}$, and operation of the process continues to step S624.

In step S624, radial fall-off curve generation unit 538 may generate radial fall-off coefficients for the selected flat-field image for each channel, e.g., R, G, B, as described below with respect to equation 30, and the resulting radial fall-off coefficients may be stored in association with the identifiers, e.g., make, model, and serial number, of the attached imaging device 100, and operation of the process continues to step S626.

In step S626, the de-convolution kernel coefficient generation unit 540 may generate spatial adaptive de-convolution kernel coefficients for the selected flat-field image for each channel, e.g., R, G, B, as described below with respect to equation 26, and the resulting spatial adaptive de-convolution kernel coefficients may be stored in association with identifiers, e.g., make, model, and serial number, for the attached imaging device 100, and operation of the process continues to step S628.

In step S628, crosstalk analysis controller 524 determines if the last flat-field image has been selected. If so, operation of the process continues to step S630 and operation of the process terminates; otherwise, operation of the process continues to step S610.

As described in the above process flow with respect to steps S610 through S618, a sharpening matrix $W_{M \times N}$ may be generated for a selected set of flat-field images, e.g., a set of flat-field images that includes a 3000K temperature flat-field image and a 5400K temperature flat-field image, using a method of steepest gradient descent.

For example, if an initial sharpening matrix is not accurately selected, e.g., such as a sharpening matrix initialized to the identity matrix in step S614, above, the radial falloff gain calculated based on a 3000K image and calculated based on a 5400K image will be quite different. However, as the sharpening matrix is optimized, the radial falloff gain difference between the 3000K and 5400K will be minimized as well.

Example steps for calculating a falloff gain difference between a 3000K image and a 5400K image may include:
1. Performing sensor response sharpening using the current sensor response sharpening matrix;
2. Calculating the falloff gain based on the sharpened RGB image: if the pixel RGB values at the image center is selected as the reference ($R_{ref}$, $G_{ref}$, $B_{ref}$), then the gain value at pixel (x,y) can be calculated as $Gain_R(x,y)=R_{ref}/R(x,y)$, $Gain_G(x,y)=G_{ref}/G(x,y)$ and $Gain_B(x,y)=B_{ref}/B(x,y)$; and
3. Calculating the gain difference sum of all pixels:
$error_R=\Sigma|Gain_{R,3000K}(x,y)-Gain_{R,5400K}(x,y)|$,
$error_G=\Sigma|Gain_{G,3000K}(x,y)-Gain_{G,5400K}(x,y)|$ and
$error_B=\Sigma|Gain_{B,3000K}(x,y)-Gain_{B,5400K}(x,y)|$.

Because adjusting each row of the current sensor response sharpening matrix will change the value of $error_R$, $error_G$ and $error_B$ correspondingly, the method of steepest descendent can be used to minimize all the 3 errors.

For example, flat-field color temperature images may be generated, as described above in step S606 and may be filtered as described above with respect to step S608 to remove noise and dark current from the generated flat-field images. Further, depending on the nature of the imaging device that generated the flat field images, the flat field images may be converted, e.g., from Bayer space to RGB, and the images may be sub-sampled to a lower resolution to reduce the amount of calculation.

Example steps for applying a method of steepest gradient descent in step S616 may include:
1. Initializing the sharpening matrix to the unity matrix (done in step S614);
2. Selecting a small value δ as the initial step length;
3. Calculating the descendent direction v;
4. Calculating the new matrix by subtracting the matrix with δ*D and the new gain ratio variance;
5. If the new gain ratio variance is smaller than the old gain ratio variance, the sharpening matrix is replaced with the step adjusted sharpening matrix, and the process returns to step 4;
6. If the new gain ratio variance is bigger than the old gain ratio variance, then the step length is decreased, e.g., δ←δ*0.8;
7. If δ is bigger than a given threshold (for example 0.0001), the process returns to step 4, otherwise the process is completed.

For a given sharpening matrix, the steps to calculate the direction of steepest descendent, as described above, may include:
1. Calculating a gain ratio variance k0 for the given sharpening matrix;
2. For each coefficient in the 3×3 matrix, changing the value by Δ and calculating the gain ratio variance, i.e., 9 new gain ratio variance k1~k9;
3. Estimating the partial derivative to each matrix coefficient, i.e., dk(i)=(ki−k0)/delta; and Calculating the direction of steepest descendent, e.g., the direction of steepest descendent, v, is given by matrix D=[dk(1), dk(2), dk(3) dk(4), dk(5), dk(6) dk(7),dk(8), dk(9)]/sqrt[Σ(dk(i)^2)].

Figure 7:
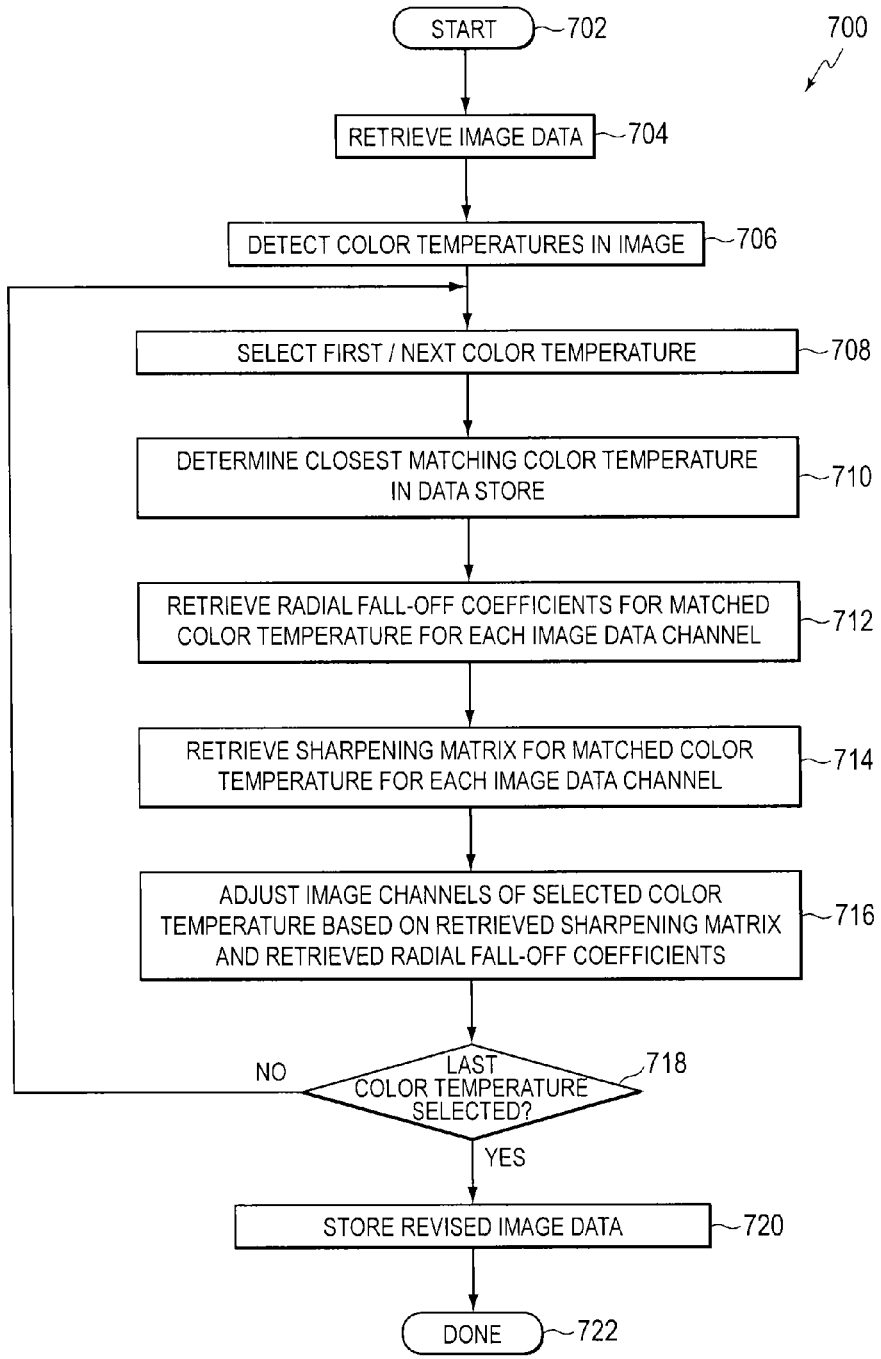
FIG. 7 shows a flow-chart of an example process that may be performed by an example imaging device to reduce optical crosstalk and radial fall-off in images generated by the imaging device based on the data parameters generated by an image crosstalk analysis device using, for example, the process described in FIG. 6.

FIG. 7 shows a flow-chart of an example process that may be performed by an example imaging device 100 to reduce optical crosstalk and radial fall-off in images generated by the imaging device based on the image correction parameters generated by an image crosstalk analysis device 500 using, for example, the process described in FIG. 6. The process described with respect to FIG. 7, assumes that sharpening matrices $W_{M \times N}$, radial fall-off coefficients, and de-convolution kernel coefficients generated for an imaging device in the process described above with respect to FIG. 6, have been uploaded to and stored within the imaging device and are accessible to image processing unit 104 within imaging device 100, as described above with respect to FIG. 1. Further, the process assumes that electrical crosstalk corrections and spectral crosstalk corrections performed by electrical crosstalk correction unit 303 and spectral crosstalk correction unit 304, as described above with respect to FIG. 3, are applied in a separate process from the process described below with respect to FIG. 7 to reduce optical crosstalk and radial falloff. As shown in FIG. 7, operation of process 700 begins at step S702 and proceeds to step S704.

In step S704, image processing unit 104 within imaging device 100 may retrieve image data generated by optical sensing unit 102 and stored in data storage unit 106, as described above with respect to FIG. 1, and operation of the process continues to step S706.

In step S706, auto white balance unit 306 may perform color balancing as described above with respect to FIG. 3, and may detect a set of color temperatures in the color balanced image data, and operation of the process continues to step S708.

In step S708, image processor unit controller 302 may select a first/next color temperature, and operation of the process continues to step S710.

In step S710, color temperature approximation unit 308 may determine a closest matching color temperature to the selected color temperature for which image correction parameters are stored in data storage unit 106 of imaging device 100, e.g., using interpolation techniques as described above with respect to FIG. 3, and operation of the process continues to step S712.

In step S712, image processor unit controller 302 may retrieve stored radial fall-off coefficients for each image data channel, e.g., R, G, B, for the selected color temperature and operation of the process continues to step S714.

In step S714, image processor unit controller 302 may retrieve stored sharpening matrix ($W_{M \times N}$) for each image data channel, e.g., R, G, B, for the selected color temperature and operation of the process continues to step S716.

In step S716, image processor unit controller 302 may instruct sharpening matrix generation unit 310 to apply the sharpening matrix ($W_{M \times N}$) retrieved for each image data channel for the currently selected color temperature to the image data retrieved in step S704, and may instruct adaptive radial falloff curve unit 312 to next apply the retrieved radial falloff coefficients for each image data channel for the currently selected color temperature to the sensor sharpened image data, as described below with respect to equation 8, and operation of the process continues to step S718.

In step S718, image processor unit controller 302 determines if the last color temperature in the image has been selected. If so, operation of the process continues to step S720; otherwise, operation of the process continues to step S708.

In step S720, image processor unit controller 302 may store the optical crosstalk/radial fall-off corrected image data to data storage unit 106, and operation of the process continues to step S722 and terminates.

It is noted that if a user has determined that sensor sharpening is not required for a particular embodiment of imaging device 100, for example, based on the user's comparative assessment of optical crosstalk and radial falloff corrected images, as described above with respect FIG. 5, image processor unit controller 302 may instruct spatial adaptive de-convolution unit 314 to apply, in accordance with equation 24 described below, the de-convolution kernel coefficients generated by de-convolution kernel coefficient generating unit 540 in place of the sharpening matrix ($W_{M \times N}$) and radial falloff coefficients as described above at step S716, and operation of the process continues to step S718.

Figure 8:
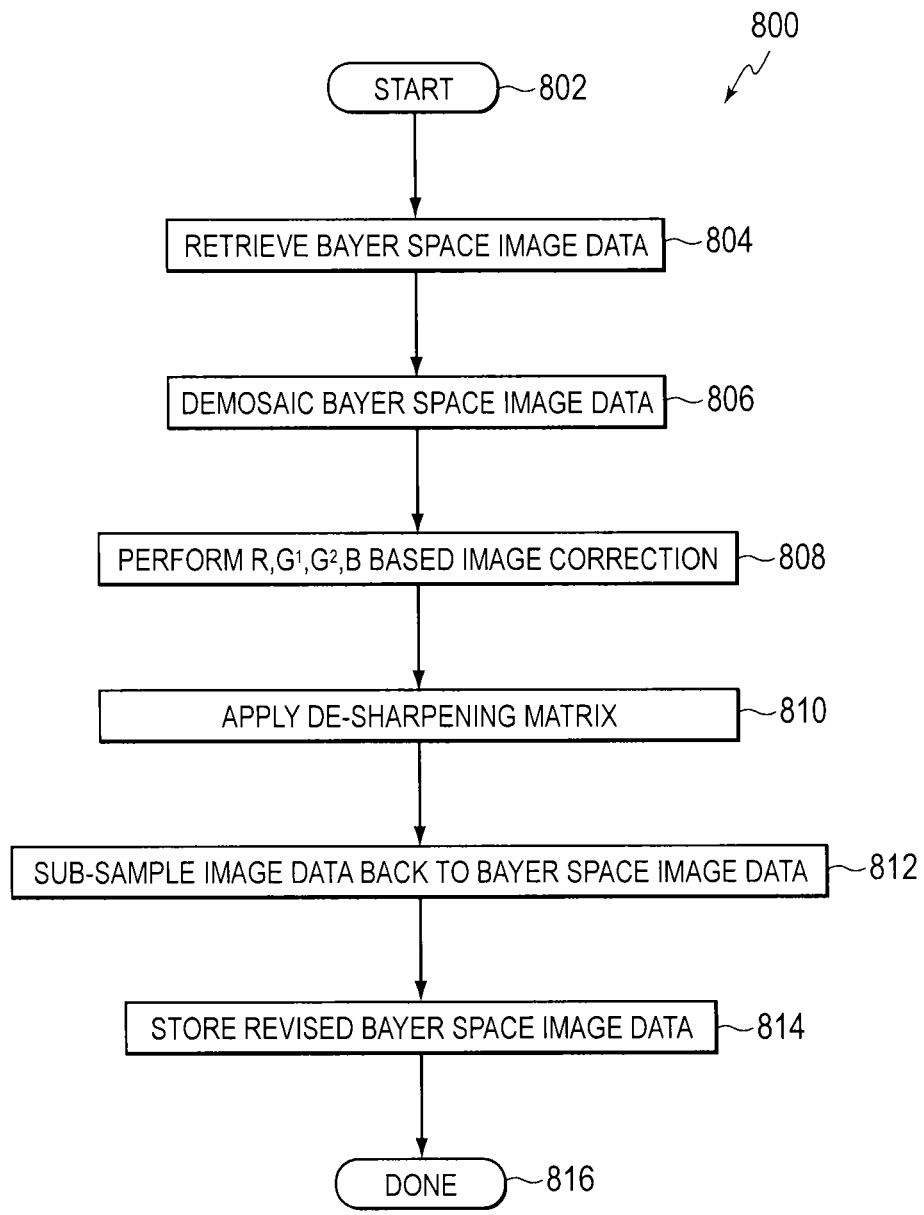
FIG. 8 shows a flow-chart of an example adaptation of the process described in FIG. 7 to reduce optical crosstalk and radial fall-off in Bayer space formatted images.

FIG. 8 shows a flow-chart of an example adaptation of the process described above with respect to FIG. 7. The process described below with respect to FIG. 8, adapts the process described above with respect to FIG. 7 to reduce optical crosstalk and radial fall-off in Bayer space formatted images. As shown in FIG. 8, operation of process 800 begins at step S802 and proceeds to step S804.

In step S804, image processing unit 104 within imaging device 100 may retrieve Bayer space formatted image data generated by optical sensing unit 102 and stored in data storage unit 106, as described above with respect to FIG. 1, and operation of the process continues to step S806.

In step S806, image processor unit controller 302 may invoke Bayer space adaptation unit 316 which, via Bayer space adaptation controller 402 and de-mosaicing unit 404, may demosaic the Bayer space image data, as described above with respect to FIG. 4, and operation of the process continues to step S808.

In step S808, image processor unit controller 302 may reduce optical crosstalk and radial fall-off in the R, $G_1$, $G_2$, B formatted image data using the process described above with respect to FIG. 7, and operation of the process continues to step S810.

In step S810, image processor unit controller 302 may invoke Bayer space adaptation controller 402 and de-sharpening unit 406, to de-sharpen the sharpen image data as described above with respect to FIG. 4, and operation of the process continues to step S812.

In step S812, image processor unit controller 302 may invoke Bayer space adaptation controller 402 and Bayer space sampling unit 408, to sub-sample the R, $G_1$, $G_2$, B formatted image data back into Bayer space formatted image data, and operation of the process continues to step S814.

In step S814, image processor unit controller 302 may store the Bayer space formatted image data to data storage unit 106, and operation of the process continues to step S816 and terminates.

Figure 9:
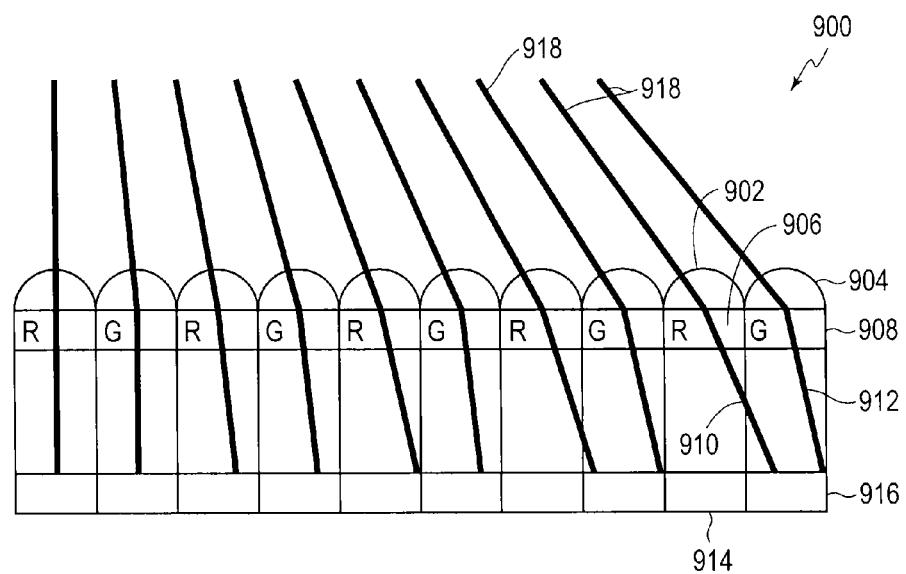
FIG. 9 is a schematic diagram of example micro-lenses, color filters and CMOS sensors as may be used in the example optical sensing unit described in FIG. 2.

FIG. 9 is a schematic diagram of example micro-lens array unit, color filter array unit, and CMOS array sensor unit, as described above with respect to FIG. 2. As shown in FIG. 9, the micro-lens array unit, color filter array unit, and CMOS array sensor unit may be formed as successive layers in a single integrated device. As further shown in FIG. 9, individual micro-lenses, e.g., as shown at 902 and 904, in the micro-lens array unit, may be aligned with individual color filter array elements, e.g., as shown at 906 and 908, in the color filter array unit, which may be further aligned with individual CMOS sensors, e.g., as shown at 914 and 916, in the CMOS sensor array unit.

In operation, unfiltered light 918 focused by a lens unit (not shown) onto a micro-lens 904 of the micro-lens array unit may be redirected by the micro-lens through a color filter element 908 aligned with the micro-lens in the direction of a CMOS sensor aligned with the micro-lens. However, as shown in FIG. 9, unfiltered light 918 impacts the respective micro-lenses at greater angles of incidence the further the respective micro-lenses are from the lens' center of focus. As a result, longer wavelengths of light within the unfiltered light incident upon micro-lenses relatively far from the lens' center of focus may not be sufficiently redirected. For example, as shown in FIG. 9, light 910 filtered by red color filter element 906 which has not been sufficiently redirected in the direction of an intended CMOS sensor, may instead land on neighboring CMOS sensor 916 causing that sensor to register inappropriately high sensor response. Due to the alternating patterns of red and green and green and blue in adjacent rows of CMOS sensor arrays, the green CMOS sensors may register inappropriately high sensor responses and the respective red CMOS sensors may register unusually low values, resulting in raw image data that contains brighter pixels, i.e., increased red tones, towards the center of the image and darker pixel values, i.e., increased blue and green tones, in a direction away from the center and towards an edge of the image.

Figure 10:
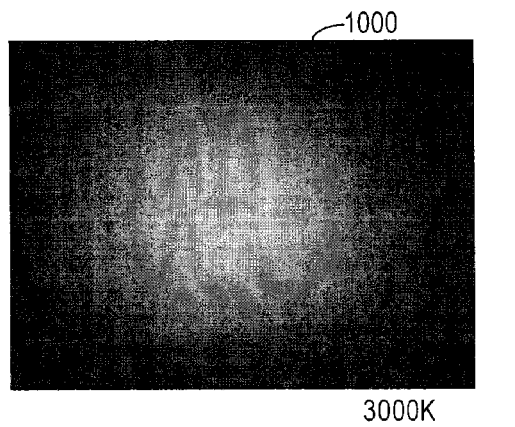
FIG. 10 is an image representing optical crosstalk and radial fall-off in an example image generated by an example imaging device of a flat-field image with a uniform color temperature of 3000° Kelvin.
Figure 11:
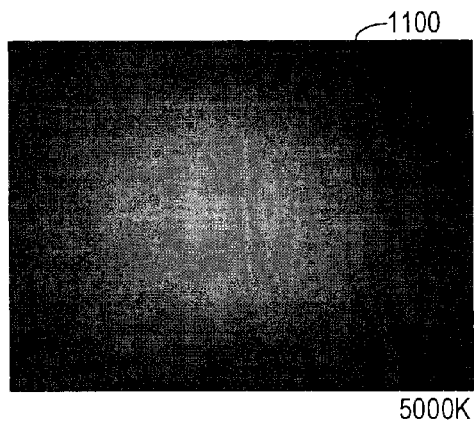
FIG. 11 is an image representing optical crosstalk and radial fall-off in an example image generated by an example imaging device of a flat-field image with a uniform color temperature of 5000° Kelvin.

FIG. 10 is an image representing optical crosstalk and radial fall-off in an example image generated by an example imaging device of a flat-field image with a uniform color temperature of 3000° Kelvin. FIG. 11 is an image representing optical crosstalk and radial fall-off in an example image generated by an example imaging device of a flat-field image with a uniform color temperature of 5000° Kelvin. As shown in FIG. 10 and FIG. 11, different color temperatures exhibit different optical crosstalk and radial fall-off conditions. As a result, it is difficult to correct for color non-uniformity in an image that includes large areas of color with very different color temperatures.

For example, a CMOS sensor's input light spectrum not only depends on the illuminant's color temperature, but also on a photographed object's reflection spectrum. For example, on a sunny day, white objects, such as highly reflective sand, may have a color temperature of 7000K, however, a clear blue sky in the same image may have a color temperature closer to 12000K. So, if a radial fall-off curve corresponding to 7000K is applied to the image data, color non-uniformity will be observed in the blue of the sky. The same problem will be present with respect to every object in the image with a color temperature significantly different from the color temperature of the flat field board used to capture the flat field image.

There are at least three problems associated with the use of existing radial fall-off curve techniques. First the existing approaches do not address optical crosstalk which increases the color error and is not corrected for by existing radial fall-off curve techniques. Second, existing radial fall-off curve techniques depend on auto-white balance to provide correct color temperature information. But existing auto-white balance techniques depend on an image free from chroma uniformity problems, therefore, under conditions in which chroma uniformity are present, auto-white balance performance may be degraded and/or wrong. Third, to eliminate visible chroma non-uniformity, 4 to 5 radial fall-off curve gain tables may be required to address all possible color temperatures within an image.

In the equations derived below, the function $L(\lambda, x, y)$ is used to denote light received at an imaging device, either directly from a light source or reflected from an object or scene to be photographed, where $\lambda$ is the wavelength and $(x,y)$ is the pixel position. Therefore, the function $L(\lambda, x, y)$ may represent the light information of the real scene to be captured, and the response of the function $L(\lambda,x, y)$ may change significantly for different wavelengths of light at different x/y locations on the CMOS array sensor on which the light falls.

The function $F(\lambda, x, y)$ is used to denote CMOS sensor array optical to electrical sensor response to incoming light under the combined effect of optical crosstalk and radial fall-off gain. As indicated by its respective operand symbols the response $F(\lambda, x, y)$ is a function of wavelength and pixel position.

Figure 12:
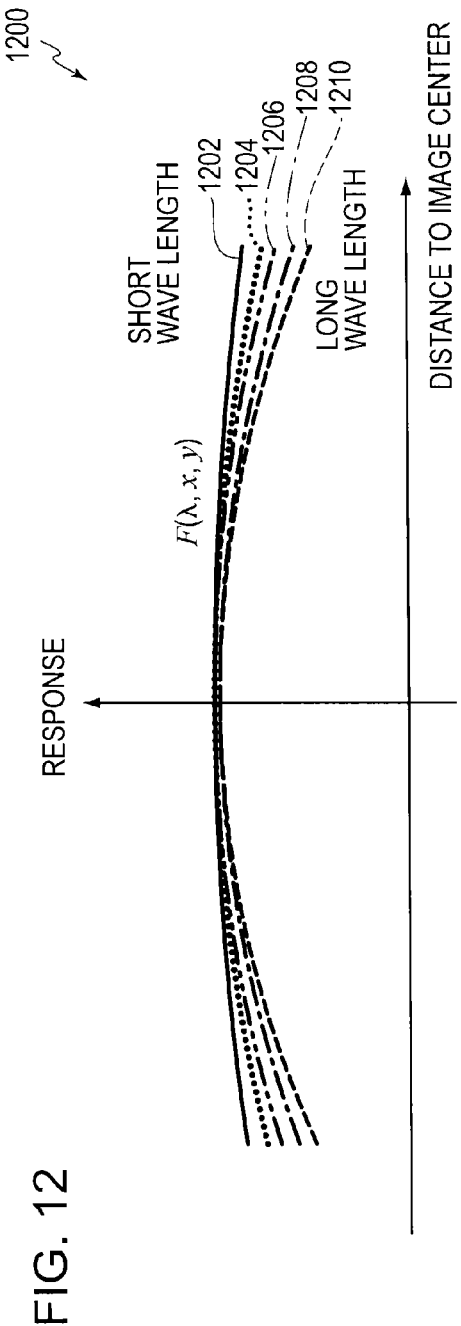
FIG. 12 shows plots of example CMOS optical-to-electrical sensor responses to different wavelengths of light by CMOS sensors at different locations in a CMOS sensor array relative to the distance to an image center.

FIG. 12 shows plots of the $F(\lambda, x, y)$ optical-to-electrical sensor responses to different wavelengths of light by CMOS sensors at different locations in a CMOS sensor array relative to the distance to an image center. As shown in FIG. 12, $F(\lambda, x, y)$ is not constant, but changes slowly as shown by the plots of $F(\lambda, x, y)$ for blue, green, yellow, orange and red at plots 1202, 1204, 1206, 1208 and 1210, respectively. The $F(\lambda, x, y)$ response has larger values at the image center, where radial fall-off and optical crosstalk are both low, but the $F(\lambda, x, y)$ response has lower values toward the surrounding edges of the image, as radial fall-off and optical crosstalk both increase. As shown in FIG. 12, the gain reduces faster, relative to the distance of a CMOS sensor from the center of the image, for longer wavelengths of light (e.g., red light at plot 1210) than for shorter wavelengths of light, e.g., blue light at plot 1202.

Figure 13:
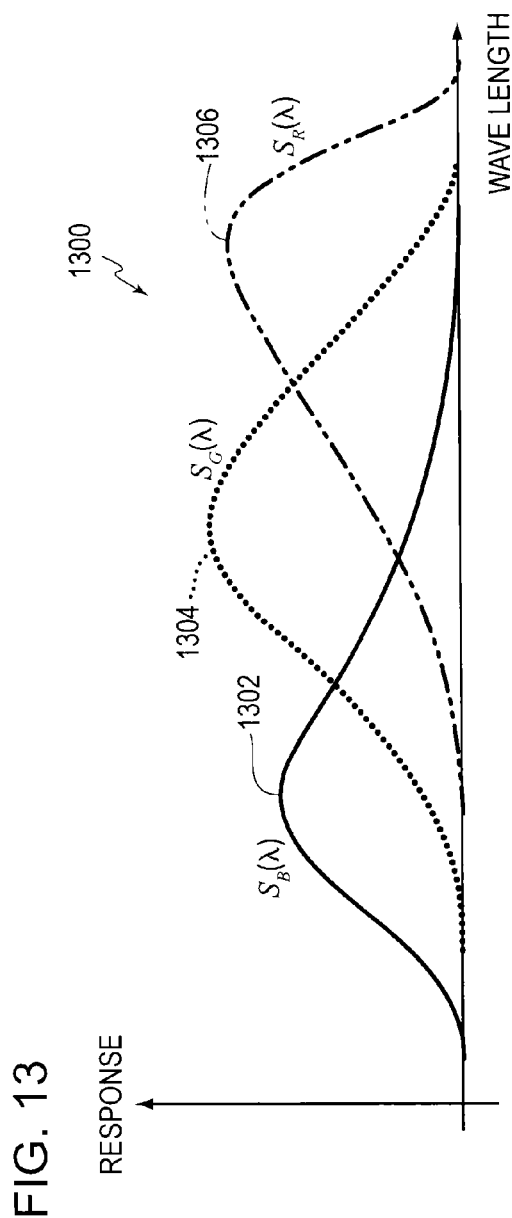
FIG. 13 shows plots of example blue, green, and red CMOS optical-to-electrical sensor responses to the respective spectrums of blue, green, and red light.

The functions $S_R(\lambda)$, $S_G(\lambda)$ and $S_B(\lambda)$ are used to denote the sensor sensitivity of the respective red, green and blue CMOS sensors relative to the wavelength of light received. FIG. 13 shows plots of example blue, green, and red CMOS optical-to-electrical sensor responses, i.e., $S_B(\lambda)$, $S_G(\lambda)$ and $S_R(\lambda)$, to the respective spectrums of blue, green, and red light. As shown in FIG. 13, the sensor responses are fairly rounded with gentle slopes, resulting in significant overlap with respect to the respective wavelengths to which each sensor type produces a response. Such rounded peaks are representative of most sensor responses and, therefore, without color correction, colors in the images generated by imaging devices that include such sensors are likely to not have sufficient saturation as compared to the original photographed scene.

Based on the description provided above, the sensor output R, G, B, values for R, G, B, pixels in a CMOS array sensor unit may be denoted by equation 1.

$$\begin{cases} R(x, y) = \int L(\lambda, x, y) F(\lambda, x, y) S_R(\lambda) d\lambda \\ G(x, y) = \int L(\lambda, x, y) F(\lambda, x, y) S_G(\lambda) d\lambda \\ B(x, y) = \int L(\lambda, x, y) F(\lambda, x, y) S_B(\lambda) d\lambda \end{cases} \quad \text{EQ. 1}$$

Where $L(\lambda, x, y)$ is the incident light received at an imaging device;

$F(\lambda, x, y)$ is sensor response under the combined effect of optical crosstalk and radial fall-off; and $S_R(\lambda)$, $S_G(\lambda)$ and $S_8(\lambda)$ are the sensor sensitivity to red, green and blue light.

The existing radial fall-off curve approach, which is described above as inadequate for addressing the effects of radial fall-off in images with large areas of colors with significant differences in color temperature, and inadequate in addressing the combined effect of both radial fall-off and optical crosstalk, may be denoted by equation 2.

$$\begin{cases} R(x, y) \approx F(\lambda_R, x, y) \int L(\lambda, x, y) S_R(\lambda) d\lambda = \\ \qquad F_R(x, y) \cdot R_{desired}(x, y) \\ G(x, y) \approx F(\lambda_G, x, y) \int L(\lambda, x, y) S_G(\lambda) d\lambda = \\ \qquad F_G(x, y) \cdot G_{desired}(x, y) \\ B(x, y) \approx F(\lambda_B, x, y) \int L(\lambda, x, y) S_B(\lambda) d\lambda = \\ \qquad F_B(x, y) \cdot B_{desired}(x, y) \end{cases} \quad \text{EQ. 2}$$

Where $R(x,y)$, $G(x,y)$ and $B(x,y)$ represent the stored RGB values for each pixel;

$F(\lambda_{R/G/B}, x, y)$ are the radial fall-off curve values for red, green and blue color temperatures, respectively;

$F_{R/G/B}(x, y)$ are approximations for the respective radial fall-off curve values; and $R/G/B_{desired}(x, y)$ represent the actual, or true, red, green and blue values at the respective pixels.

The approximation presented in equation 2 is often inadequate in that it is unable to handle scenes with relative large areas of colors with significantly different color temperatures. However, the approach presented in equation 2 would be greatly improved if the color filters had a sharp, impulse response, in which the respective sensor responses have a constant value for designated red, green and blue wavelengths, and a value of zero for other wavelengths, as depicted below in equation 3.

$$S_R(\lambda) = \begin{cases} K_R, \lambda = \lambda_R \\ 0, \lambda \neq \lambda_R \end{cases},$$

$$S_G(\lambda) = \begin{cases} K_G, \lambda = \lambda_G \\ 0, \lambda \neq \lambda_G \end{cases} \text{ and }$$

$$S_B(\lambda) = \begin{cases} K_B, \lambda = \lambda_B \\ 0, \lambda \neq \lambda_B \end{cases}$$

EQ. 3

Where $K_{R/G/B}$ are constant values.

In actuality, sensors with such impulse responses are not available, however, linear processing may be used to sharpen the sensor response as much as possible, thereby allowing for improved performance. For example, a strict deduction that verifies that a sharpened sensor spectrum will result in a more accurate result may be provided with respect to the Mean Value Theorem for Integrals as presented below in equation 4 and equation 5.

$$\int_a^b f(x)g(x)dx = f(\xi)\int_a^b g(x)dx, (a \leq \xi \leq b)$$

EQ. 4

For a given color, for example red (R), the Mean Value Theorem presented in equation 4 may be represented as shown in equation 5.

$$R(x,y) = \int L(\lambda,x,y)F(\lambda,x,y)S_R(\lambda)d\lambda = F(\lambda_R,x,y)\int L(\lambda,x,y)S_R(\lambda)d\lambda$$

EQ. 5

In equation 5, $\lambda_R$ is not a constant for all $L(\lambda, x, y)$, but it is always in the response range of R sensor. If $S_R(\lambda)$ is sharp enough and $F(\lambda, x, y)$ doesn't change very fast along with wave length, then $F(\lambda_R, x, y)$ can be seen as a constant.

Figure 14:
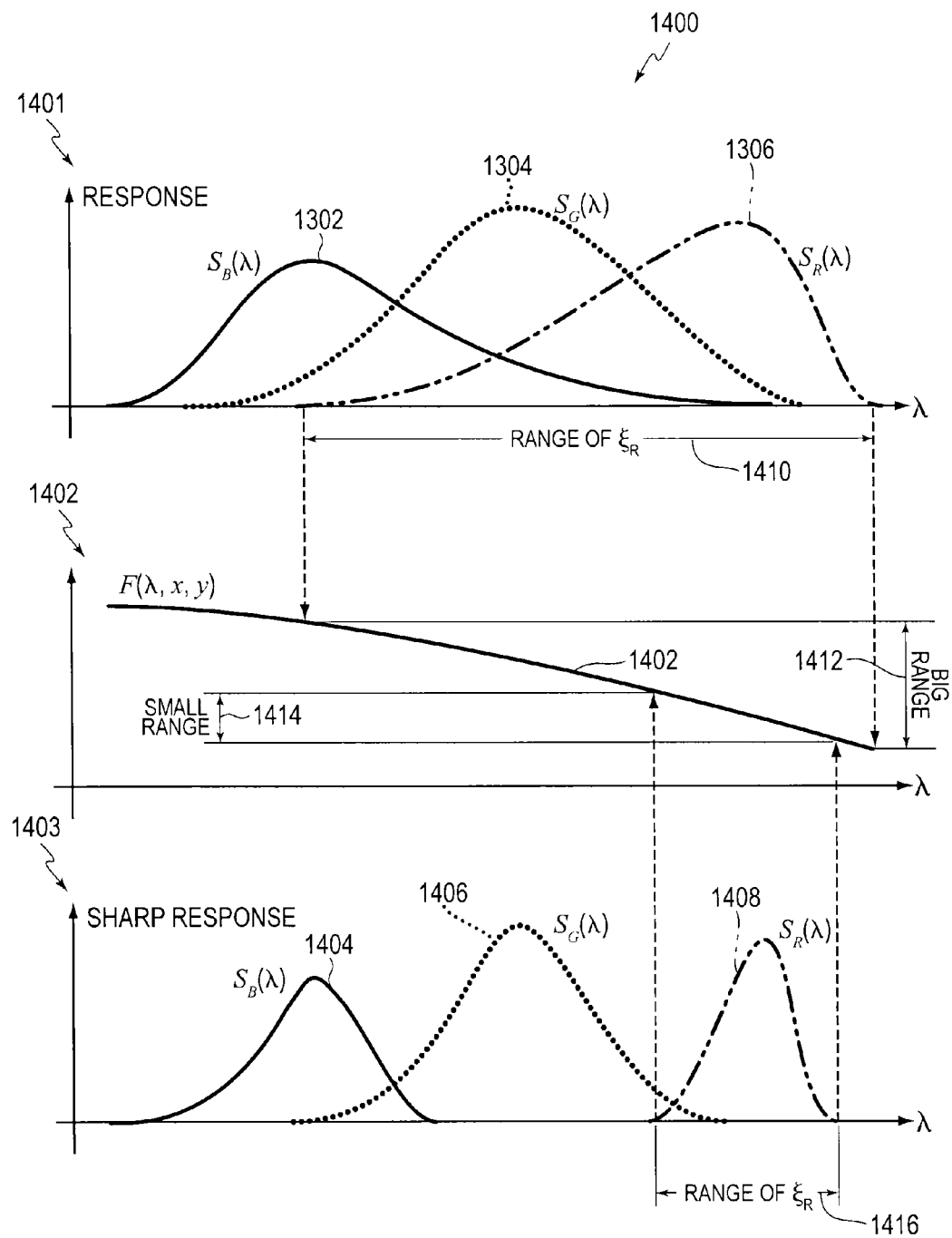
FIG. 14 shows plots of the optical-to-electrical responses of the plot of FIG. 13, both before and after proposed sensor response sharpening post processing, relative to a plot representing the combined effect of optical crosstalk and radial fall-off gain on CMOS sensor response relative the wavelength.

FIG. 14 shows plots of the optical-to-electrical responses of the plot of FIG. 13, both before the proposed sensor response sharpening post processing, at 1401, and after the proposed sensor response sharpening post processing, at 1403. Plots 1401 and 1403 are shown relative to a plot of $F(\lambda, x, y)$, at 1402, representing CMOS sensor response under the combined effect of optical crosstalk and radial fall-off gain relative to wavelength.

For example, the non-sharpened signal responses $S_B(\lambda)$, $S_G(\lambda)$ and $S_R(\lambda)$ are shown at 1302, 1304 and 1306, respectively. The sharpened signal responses $S_B(\lambda)$, $S_G(\lambda)$ and $S_R(\lambda)$ are shown at 1404, 1406, and 1408, respectively. As further shown in FIG. 14, the range $\xi_R$ of non-sharpened $S_R(\lambda)$ shown at 1410 corresponds to a large range of $F(\lambda, x, y)$, as shown at 1412. However, the range $\xi_R$ of sharpened $S_R(\lambda)$ shown at 1416 corresponds to a small range of $F(\lambda, x, y)$, as shown at 1414.

Based on the above description, it can now be shown that a linear combination $C_{sharp}$ matrix may be applied to the original sensor spectrum response, to generate sharper sensor spectrum responses of $S'_R(\lambda)$, $S'_G(\lambda)$ and $S'_B(\lambda)$, as expressed in equation 6.

$$\begin{pmatrix} S'_R(\lambda) \\ S'_G(\lambda) \\ S'_B(\lambda) \end{pmatrix} = C_{sharp} \begin{pmatrix} S_R(\lambda) \\ S_G(\lambda) \\ S_B(\lambda) \end{pmatrix}$$

EQ. 6

Therefore, the new R, G and B values based on such sensor spectrum response should may be expressed as shown in equation 7, below.

$$\begin{pmatrix} R'(x, y) \\ G'(x, y) \\ B'(x, y) \end{pmatrix} \approx \begin{pmatrix} \int L(\lambda, x, y)F(\lambda, x, y)S'_R(\lambda)d\lambda \\ \int L(\lambda, x, y)F(\lambda, x, y)S'_G(\lambda)d\lambda \\ \int L(\lambda, x, y)F(\lambda, x, y)S'_B(\lambda)d\lambda \end{pmatrix} =$$

$$C_{sharp} \begin{pmatrix} \int L(\lambda, x, y)F(\lambda, x, y)S_R(\lambda)d\lambda \\ \int L(\lambda, x, y)F(\lambda, x, y)S_G(\lambda)d\lambda \\ \int L(\lambda, x, y)F(\lambda, x, y)S_B(\lambda)d\lambda \end{pmatrix} = C_{sharp} \begin{pmatrix} R(x, y) \\ G(x, y) \\ B(x, y) \end{pmatrix}$$

EQ. 7

Once the new sharpened R, G, and B values are determined in accordance with equation 7, the old radial fall-off equation presented at equation may be rewritten as shown in equation 8, below.

$$\begin{pmatrix} R(x, y) \\ G(x, y) \\ B(x, y) \end{pmatrix}_{foc} = \begin{pmatrix} F_R(x, y) & & \\ & F_G(x, y) & \\ & & F_B(x, y) \end{pmatrix} C_{sharp} \begin{pmatrix} R(x, y) \\ G(x, y) \\ B(x, y) \end{pmatrix}$$

EQ. 8

As shown in equation 8, the approach described above may be represented as a position adaptive color correction method with the limitation that the color correction matrix can be split into a position adaptive diagonal matrix and a non-position adaptive matrix.

The derivation of a sensor response model is described, below, that allows the combined effect of radial fall-off and optical crosstalk to be effectively reduced. In the description below, input light from a real scene is depicted as $L(\lambda, x, y)$, in which $\lambda$ is the wavelength, (x,y) is the pixel position. Radial fall-off gain, depicted as $RF(\lambda, x, y)$, is assumed to be related to wave length and pixel position, but constant for different luminance. Individual color filters depicted as $F_R(\lambda)$, $F_{G1}(\lambda)$, $F_{G2}(\lambda)$ and $F_B(\lambda)$, may also be written as $F(x, y, \lambda)$, since if x, y is known, it is known whether its value is $F_R(\lambda)$, $F_{G1}(\lambda)$, $F_{G2}(\lambda)$ or $F_B(\lambda)$. The radial optical crosstalk coefficients may be depicted as OCT $(\lambda, x, y, i, j)$, in which for "i" and "j" are integers in between −OCR and OCR, which denote a maximum optical crosstalk range.

Further, when crosstalk occurs, light through a current pixel's color filter may fall into an adjacent pixel sensor. OCT(x, y, i, j) may represent the percentage of light with wavelength $\lambda$ that is leaked from pixel (x,y) to pixel (x+i,y+j). CMOS sensor sensitivity may be depicted as $s(\lambda)$. Further, it is assumed that the color filter at the top of pixels have three types, i.e., R, G, B, but the CMOS sensor at the bottom of pixels are assumed to be all the same. In addition, electrical crosstalk may be denoted as ECT (i, j), in which values for "i" and "j" are integers in between –ECR and ECR, which denote a maximum electrical crosstalk range.

Based on the above notations, the light energy passing through the color filter of a pixel X, pixel X may be R, $G_1$, $G_2$ or B at (x,y), may be described by equation 9, below.

$$L'(\lambda, x, y) = L(\lambda, x, y) \cdot RF(\lambda, x, y) \cdot F_X(\lambda) \qquad \text{EQ. 9}$$

After consideration of optical crosstalk with respect to neighbor pixels and optical to electrical conversion, $$E(x, y) = \qquad \text{EQ. 10}$$
$$\int s(\lambda) \sum_{i,j \in [-OCTR, OCTR]} [L'(\lambda, x+i, y+j) \cdot OCT(\lambda, x, y, i, j)] \cdot d\lambda$$

After electrical crosstalk and read out, $$X(x, y) = \sum_{i,j \in [-ECTR, ECTR]} [E(x, y) \cdot ECT(i, j)] + \text{dark\_current} \qquad \text{EQ. 11}$$

Next, noise and non-linearity of optical to electrical conversion may be ignored and dark current may be removed. Thus the approach may be re-written as shown in equation 12.

$$X(x, y) = \int \sum_{i,j \in [-CTR, CTR]} [s(\lambda)L'(\lambda, x, y)CT(\lambda, x, y, i, j)] \cdot d\lambda \qquad \text{EQ. 12}$$

Where $CT(\lambda, x, y, i, j)$ is the 2D-convolution of $OCT(\lambda, x, y, i, j)$ and $ECT(-i, -j)$, and $CTR=ECTR+OCTR-1$.

Equation 12 may be rewritten as shown in equation 13.

$$X(x, y) = \qquad \text{EQ. 13}$$
$$\int \left\{ \sum_{i,j \in [-CTR, CTR]} [L(\lambda, x+i, y+j) \cdot RF(\lambda, x+i, y+j) \cdot s(\lambda) \right.$$
$$\left. F(x+i, y+j, \lambda) \cdot CT(\lambda, x, y, i, j)] \right\} \cdot d\lambda$$

Further, we can denote $s(\lambda) \cdot F(x, y, \lambda)$ as $S(x, y, \lambda)$, or as $S_R(\lambda)$, $S_{G1}(\lambda)$, $S_{G2}(\lambda)$ and $S_B(\lambda)$ if the pixel position (x,y) is known. Also, we can denote $RF(\lambda, x+i, y+j) \cdot CT(\lambda, x, y, i, j)$ as $RFCT(\lambda, x, y, i, j)$, so equation 13 may be rewritten as shown in equation 14.

$$X(x, y) = \int \left\{ \sum_{i,j \in [-CTR, CTR]} L(\lambda, x+i, y+j) \cdot \right. \qquad \text{EQ. 14}$$
$$\left. S(\lambda, x+i, y+j) \cdot RFCT(\lambda, x, y, i, j) \right\} \cdot d\lambda$$

Although equation 14 provides a solution for correcting for both radial fall-off and optical crosstalk in a generated image, equation 14 would be difficult to implement efficiently. A more desirable form of equation 14 that would efficiently supporting Bayer-space formatted image data would be of the format presented in equation 15, below.

$$X_{desired}(x, y) = \int L(\lambda, x, y) \cdot S(\lambda, x, y) \cdot d\lambda \qquad \text{EQ. 15}$$

Therefore, derivation of an accurate approximation of the solution presented in equation 14 is provided below. In the first step in deriving an accurate approximation to the solution presented in equation 14 the functions $Y(\lambda, x, y)$ and $Y_{desire}(\lambda, x, y)$ may be defined as shown in equation 16 and equation 17, below.

$$Y(\lambda, x, y) = \sum_{i,j \in [-CTR, CTR]} L(\lambda, x+i, y+j) \cdot \qquad \text{EQ. 16}$$
$$S(\lambda, x+i, y+j) \cdot RFCT(\lambda, x, y, i, j)$$

$$Y_{desired}(\lambda, x, y) = L(\lambda, x, y) \cdot S(\lambda, x, y) \qquad \text{EQ. 17}$$

Therefore, $X(x, y)$ and $X_{desired}(x, y)$ may be defined in terms of functions $Y(\lambda, x, y)$ and $Y_{desire}(\lambda, x, y)$ as shown in equation 18 and equation 19, $$X(x, y) = \int_{\lambda_{blue}}^{\lambda_{red}} Y(\lambda, x, y) \cdot d\lambda \qquad \text{EQ. 18}$$

and, $$X_{desired}(x, y) = \int_{\lambda_{blue}}^{\lambda_{red}} Y_{desired}(\lambda, x, y) \cdot d\lambda \qquad \text{EQ. 19}$$

Where $(\lambda_{blue}, \lambda_{red})$ is the wave length range for the light that can generate a response on sensors.

Further, it is noted that if $RFCT(\lambda, x, y, i, j)$ is constant for (x, y), $RFCT(\lambda, x, y, i, j)$ may be re-written as $RFCT(\lambda, i, j)$, and $Y(\lambda, x, y)$ is a convolution between $Y_{desire}(\lambda, x, y)$ and $RFCT(\lambda, -i, -j)$. Therefore, $Y_{desired}(\lambda, x, y)$ may be recovered from $Y(\lambda, x, y)$ using a de-convolution based on a convolution kernel which has a reversed effect of $RFCT(\lambda, -i, -j)$.

While an ideal de-convolution kernel can have an infinite size, in practice a limited length de-convolution kernel can also solve the problem very well. In the case at hand, $RFCT(\lambda, x, y, i, j)$ is spatially variant, but changes very slowly, and our de-convolution kernel, which is limited in a small range which $RFCT(\lambda, x, y, i, j)$ doesn't change significantly, so it's reasonable to believe that a spatial adaptive de-convolution kernel may be used. This means that a linear combination of $Y(\lambda, x, y)$ with spatial adaptive coefficients can approximately recover $Y_{desired}(\lambda, x, y)$ as shown in equation 20.

$$Y_{desired}(\lambda, x, y) \approx \qquad \text{EQ. 20}$$
$$\sum_{i,j \in [-IRFCTR, IRFCTR]} Y(\lambda, x+i, y+j) \cdot IRFCT(\lambda, x, y, i, j)$$

Where $IRFCT(\lambda, x, y, -i, -j)$ is an IRFCTR×IRFCTR spatial adaptive de-convolution kernel.

By integrating both sides of equation 21 from $\lambda_{blue}$ to $\lambda_{red}$, we obtain equation 21.

$$X_{desired}(x, y) \approx \int_{\lambda_{blue}}^{\lambda_{red}} \sum_{i,j \in [-IRFCTR, IRFCTR]} Y(\lambda, x+i, y+j) \cdot \qquad \text{EQ. 21}$$
$$IRFCT(\lambda, x, y, i, j) \cdot d\lambda$$

As described above, the "Mean Value Theorem for Integrals" may be represented as shown in equation 22.

$$\int_a^b f(x)g(x)dx = f(\xi)\int_a^b g(x)dx, \ (a \le \xi \le b) \quad \text{EQ. 22}$$

Therefore, equation 21 may be rewritten as equation 23.

$$X_{desired}(x, y) \approx \sum_{i,j \in [-IRFCTR, IRFCTR]} IRFCT(\lambda_X, x, y, i, j) \quad \text{EQ. 23}$$

$$\int_{\lambda_{blue}}^{\lambda_{red}} Y(x+i, y+j) \cdot d\lambda =$$

$$\sum_{i,j \in [-IRFCTR, IRFCTR]} IRFCT(\lambda_X, x, y, i, j) X(x+i, y+j)$$

It is noted that $\lambda_X$ is not a constant for x, y, i, j. For example, when $Y(\lambda, x, y)$ changes, $\lambda_X$ will also change. However, is known that $\lambda_{blue} \le \lambda_X \le \lambda_{red}$. Therefore, if the pixel position is known, i.e., the pixel type is known as red, green or blue, the range can be further limited to the range of that red, green and blue pixel that is generating the response at that location.

Since $IRFCT(\lambda, x, y, i, j)$ changes slowly (not across R, G1, G2, B channel, just inside any one of channels) along with $\lambda$, and if $S_R(\lambda)$, $S_{G1}(\lambda)$, $S_{G2}(\lambda)$ and $S_B(\lambda)$ are sharp enough, equation 23 may be rewritten as equation 24.

$$\overline{X}(x, y) = \sum_{i,j \in [-IRFCTR, IRFCTR]} IRFCT(x, y, i, j) X(x+i, y+j) \quad \text{EQ. 24}$$

Therefore, if the R, G1, G2, B sensors have sharp spectrum responses, the approximated radial fall-off and crosstalk reduction result in Bayer space can be represented as the convolution between the captured image and a spatial adaptive convolution kernel. The convolution kernel is spatial adaptive and is different across R, G1, G2 and B channels (that is because $\lambda_{blue} \le \lambda_X \le \lambda_{red}$ and the response range of $S_R(\lambda)$, $S_{G1}(\lambda)$, $S_{G2}(\lambda)$ and $S_B(\lambda)$ are different), but in each of these four channels, the kernel changes slowly along with the pixel position.

However, if the sensor spectrum response is not sharp enough, we may want to try the sharpening technique described above. However, after the sharpening, the pixel value doesn't follow the equation 15 and the equation 24 will contain error.

Understanding the sensor sharpening process requires knowledge of R, G, B data for one same pixel, and now the only way to do that is interpolation. A linear interpolation is a non-spatial-adaptive convolution. Combining the linear interpolation convolution, sensor sharpening matrix and CT/RF convolution kernel, still deduces the same form of CT/RF convolution, only with a larger size of convolution kernel.

The color temperature adaptive radial fall-off curve is the simplest form of equation 24 in which the de-convolution matrix is 1×1. The sensor spectrum sharpening based RF/CT method in Bayer space is also one of the forms of equation 24, in which the de-convolution matrix is 3×3. For example, equation 8 can be re-formed for red pixels in RGB formatted image data, as shown in equation 25. Equation 8 may be similarly re-formed for green and blue pixels.

$$R_{foc}(x, y) = \quad \text{EQ. 25}$$

$$F_R(x,y) \cdot C_{sharp,(1,*)} \cdot \begin{pmatrix} R(x, y) \\ G(x, y-1) + G(x-1, y) + \\ \dfrac{G(x+1, y) + G(x, y+1)}{4} \\ B(x-1, y-1) + B(x+1, y-1) + \\ \dfrac{B(x-1, y+1) + B(x+1, y+1)}{4} \end{pmatrix} =$$

$$\begin{pmatrix} c_{11} \cdot F_R(x, y) \\ \dfrac{c_{12}}{4} \cdot F_R(x, y) \\ \dfrac{c_{12}}{4} \cdot F_R(x, y) \\ \dfrac{c_{12}}{4} \cdot F_R(x, y) \\ \dfrac{c_{12}}{4} \cdot F_R(x, y) \\ \dfrac{c_{13}}{4} \cdot F_R(x, y) \\ \dfrac{c_{13}}{4} \cdot F_R(x, y) \\ \dfrac{c_{13}}{4} \cdot F_R(x, y) \\ \dfrac{c_{13}}{4} \cdot F_R(x, y) \end{pmatrix} \cdot \begin{pmatrix} R(x, y) \\ G(x, y-1) \\ G(x-1, y) \\ G(x+1, y) \\ G(x, y+1) \\ B(x-1, y-1) \\ B(x+1, y-1) \\ B(x-1, y+1) \\ B(x+1, y+1) \end{pmatrix}$$

An approach for estimating spatial adaptive de-convolution kernel coefficients is derive below with respect to equations 26 through 34, in which the following conventions are used. Neighboring pixels of a sensor in a CMOS sensor array at pixel (x,y) are numbered as pixel 1, 2, ... N, including pixel (x,y) itself; the notation D(x, y, n), n=1~N is used to replace the notation IRFCT(x, y, i, j); and the neighbor pixels values of pixel (x,y) in the Bayer pattern image are noted as P(x, y, n), n=1~N.

The coefficients in the kernel change slowly along with (x,y), and there may be big correlation among n coefficients at same pixel. Therefore, assuming that there are M parameters that are independent for each pixel, D(x, y, n) may be expressed as shown in equation 26.

$$\begin{pmatrix} D(x, y, 1) \\ D(x, y, 2) \\ \cdots \\ D(x, y, N) \end{pmatrix}^T = \begin{pmatrix} E(x, y, 1) \\ E(x, y, 2) \\ \cdots \\ E(x, y, M) \end{pmatrix}^T \cdot W_{M \times N}, \quad \text{EQ. 26}$$

$$\text{Where } W_{M \times N} = \begin{pmatrix} w_{11} & w_{12} & \cdots & w_{1N} \\ w_{21} & w_{22} & \cdots & w_{2N} \\ \cdots & \cdots & \cdots & \cdots \\ w_{M1} & w_{M2} & \cdots & w_{MN} \end{pmatrix},$$

and $|W_{M \times N}| = 1$

By applying equation 24 to equation 26, we obtain equation 27.

$$\overline{X}(x, y) = \begin{pmatrix} E(x, y, 1) \\ E(x, y, 2) \\ \cdots \\ E(x, y, M) \end{pmatrix}^T \cdot W_{M \times N} \cdot \begin{pmatrix} P(x, y, 1) \\ P(x, y, 2) \\ \cdots \\ P(x, y, N) \end{pmatrix} \quad \text{EQ. 27}$$

Assuming that there are M images, equation 27 may be rewritten as equation 28.

$$\begin{pmatrix} \overline{X}_1(x,y) \\ \overline{X}_2(x,y) \\ \dots \\ \overline{X}_M(x,y) \end{pmatrix} = \begin{pmatrix} E(x,y,1) \\ E(x,y,2) \\ \dots \\ E(x,y,M) \end{pmatrix}^T \cdot W_{M \times N} \cdot \begin{pmatrix} P_1(x,y,1) & P_2(x,y,1) & \dots & P_M(x,y,1) \\ P_1(x,y,2) & P_2(x,y,2) & \dots & P_M(x,y,2) \\ \dots & \dots & \dots & \dots \\ P_1(x,y,N) & P_2(x,y,N) & \dots & P_M(x,y,N) \end{pmatrix} \quad \text{EQ. 28}$$

Equation 28 may be rewritten as equation 29.

$$\begin{pmatrix} \overline{X}_1(x,y) \\ \overline{X}_2(x,y) \\ \dots \\ \overline{X}_M(x,y) \end{pmatrix} \cdot \left[ W_{M \times N} \cdot \begin{pmatrix} P_1(x,y,1) & P_2(x,y,1) & \dots & P_M(x,y,1) \\ P_1(x,y,2) & P_2(x,y,2) & \dots & P_M(x,y,2) \\ \dots & \dots & \dots & \dots \\ P_1(x,y,N) & P_2(x,y,N) & \dots & P_M(x,y,N) \end{pmatrix} \right]^{-1} = \begin{pmatrix} E(x,y,1) \\ E(x,y,2) \\ \dots \\ E(x,y,M) \end{pmatrix}^T \quad \text{EQ. 29}$$

If only $W_{M \times X}$ and $$\begin{pmatrix} P_1(x,y,1) & P_2(x,y,1) & \dots & P_M(x,y,1) \\ P_1(x,y,2) & P_2(x,y,2) & \dots & P_M(x,y,2) \\ \dots & \dots & \dots & \dots \\ P_1(x,y,N) & P_2(x,y,N) & \dots & P_M(x,y,N) \end{pmatrix}$$

have order of M.

Similarly, for another M images, $$\begin{pmatrix} \overline{X}_{M+1}(x,y) \\ \overline{X}_{M+2}(x,y) \\ \dots \\ \overline{X}_{M+M}(x,y) \end{pmatrix} \cdot \left[ W_{M \times N} \cdot \begin{pmatrix} P_{M+1}(x,y,1) & P_{M+2}(x,y,1) & \dots & P_{M+M}(x,y,1) \\ P_{M+1}(x,y,2) & P_{M+2}(x,y,2) & \dots & P_{M+M}(x,y,2) \\ \dots & \dots & \dots & \dots \\ P_{M+1}(x,y,N) & P_{M+2}(x,y,N) & \dots & P_{M+M}(x,y,N) \end{pmatrix} \right]^{-1} = \begin{pmatrix} E(x,y,1) \\ E(x,y,2) \\ \dots \\ E(x,y,M) \end{pmatrix}^T \quad \text{EQ. 30}$$

If only $W_{M \times N}$ and $$\begin{pmatrix} P_{M+1}(x,y,1) & P_{M+2}(x,y,1) & \dots & P_{M+M}(x,y,1) \\ P_{M+1}(x,y,2) & P_{M+2}(x,y,2) & \dots & P_{M+M}(x,y,2) \\ \dots & \dots & \dots & \dots \\ P_{M+1}(x,y,N) & P_{M+2}(x,y,N) & \dots & P_{M+M}(x,y,N) \end{pmatrix}$$

have order of M.

Combining equation 29 with equation 30 results in equation 31.

$$\begin{pmatrix} \overline{X}_1(x,y) \\ \overline{X}_2(x,y) \\ \dots \\ \overline{X}_M(x,y) \end{pmatrix} \cdot \left[ W_{M \times N} \cdot \begin{pmatrix} P_1(x,y,1) & P_2(x,y,1) & \dots & P_M(x,y,1) \\ P_1(x,y,2) & P_2(x,y,2) & \dots & P_M(x,y,2) \\ \dots & \dots & \dots & \dots \\ P_1(x,y,N) & P_2(x,y,N) & \dots & P_M(x,y,N) \end{pmatrix} \right]^{-1} = \begin{pmatrix} \overline{X}_{M+1}(x,y) \\ \overline{X}_{M+2}(x,y) \\ \dots \\ \overline{X}_{M+M}(x,y) \end{pmatrix} \cdot \left[ W_{M \times N} \cdot \begin{pmatrix} P_{M+1}(x,y,1) & P_{M+2}(x,y,1) & \dots & P_{M+M}(x,y,1) \\ P_{M+1}(x,y,2) & P_{M+2}(x,y,2) & \dots & P_{M+M}(x,y,2) \\ \dots & \dots & \dots & \dots \\ P_{M+1}(x,y,N) & P_{M+2}(x,y,N) & \dots & P_{M+M}(x,y,N) \end{pmatrix} \right]^{-1} \quad \text{EQ. 31}$$

Assuming that the images are captured under a controlled environment, and $X_1(x, y), \dots X_{2M}(x, y)$ are all known, $\overline{X} \cdot (x, y)$ in equation 31 may be replaced, resulting in equation 32.

$$\begin{pmatrix} X_1(x,y) \\ X_2(x,y) \\ \dots \\ X_M(x,y) \end{pmatrix} \cdot \left[ W_{M \times N} \cdot \begin{pmatrix} P_1(x,y,1) & P_2(x,y,1) & \dots & P_M(x,y,1) \\ P_1(x,y,2) & P_2(x,y,2) & \dots & P_M(x,y,2) \\ \dots & \dots & \dots & \dots \\ P_1(x,y,N) & P_2(x,y,N) & \dots & P_M(x,y,N) \end{pmatrix} \right]^{-1} = \begin{pmatrix} X_{M+1}(x,y) \\ X_{M+2}(x,y) \\ \dots \\ X_{M+M}(x,y) \end{pmatrix} \cdot \left[ W_{M \times N} \cdot \begin{pmatrix} P_{M+1}(x,y,1) & P_{M+2}(x,y,1) & \dots & P_{M+M}(x,y,1) \\ P_{M+1}(x,y,2) & P_{M+2}(x,y,2) & \dots & P_{M+M}(x,y,2) \\ \dots & \dots & \dots & \dots \\ P_{M+1}(x,y,N) & P_{M+2}(x,y,N) & \dots & P_{M+M}(x,y,N) \end{pmatrix} \right]^{-1} \quad \text{EQ. 32}$$

In the above equations, the matrix $W_{M \times N}$ is not known. In the real case, $W_{M \times N}$ can not be directly calculated because of noise, and also because the assumption of equation (22) might not be true. However, the error may be defined as shown below in equation 33.

$$\text{Error}(x, y) = \begin{pmatrix} X_1(x, y) \\ X_2(x, y) \\ \ldots \\ X_M(x, y) \end{pmatrix} - \left[ W_{M \times N} \cdot \begin{pmatrix} P_1(x, y, 1) & P_2(x, y, 1) & \ldots & P_M(x, y, 1) \\ P_1(x, y, 2) & P_2(x, y, 2) & \ldots & P_M(x, y, 2) \\ \ldots & \ldots & \ldots & \ldots \\ P_1(x, y, N) & P_2(x, y, N) & \ldots & P_M(x, y, N) \end{pmatrix}^{-1} \right] - \begin{pmatrix} X_{M+1}(x, y) \\ X_{M+2}(x, y) \\ \ldots \\ X_{M+M}(x, y) \end{pmatrix} \left[ W_{M \times N} \cdot \begin{pmatrix} P_{M+1}(x, y, 1) & P_{M+2}(x, y, 1) & \ldots & P_{M+M}(x, y, 1) \\ P_{M+1}(x, y, 2) & P_{M+2}(x, y, 2) & \ldots & P_{M+M}(x, y, 2) \\ \ldots & \ldots & \ldots & \ldots \\ P_{M+1}(x, y, N) & P_{M+2}(x, y, N) & \ldots & P_{M+M}(x, y, N) \end{pmatrix}^{-1} \right] \quad \text{EQ. 33}$$

Further, the total error may be defined based on equation 33, as shown in equation 34, below.

$$\text{Total\_error} = \sum_{(x,y) \in image} \|\text{Error}(x, y)\|_2 \quad \text{EQ. 34}$$

The total error may be approximated using a computer based on equation 29 using the steepest falling gradient method. To increase the computation speed, such a calculation may be performed on a sub-sampled image.

For purposes of explanation in the above description, numerous specific details are set forth in order to provide a thorough understanding of the described imaging device and an image crosstalk analysis device that reduce optical crosstalk and radial fall-off in image data generated using an array sensor unit. It will be apparent, however, to one skilled in the art that the described imaging device and an image crosstalk analysis device that reduce optical crosstalk and radial fall-off in image data may be practiced without these specific details. In other instances, well-known structures and devices are shown in block diagram form in order to avoid obscuring the features of the described imaging device and an image crosstalk analysis device.

While the imaging device and an image crosstalk analysis device that reduce optical crosstalk and radial fall-off in image data have been described in conjunction with the specific embodiments thereof, it is evident that many alternatives, modifications, and variations will be apparent to those skilled in the art. Accordingly, embodiments of the imaging device and an image crosstalk analysis device that reduce optical crosstalk and radial fall-off in image data, as set forth herein, are intended to be illustrative, not limiting. There are changes that may be made without departing from the spirit and scope of the invention.

What is claimed is:

1. An imaging device, comprising:
   a sensing unit configured to generate image data containing a plurality of color channels; and
   a processing unit configured to process the color channels to remove a distortion based on a plurality of image correction parameters, the processing unit including an adaptation unit configured to convert the image data from a first space formatted image data to R, $G_1$, $G_2$, B data prior to a reduction of the distortion and convert the R, $G_1$, $G_2$, B data back to the first space formatted image data after the reduction of the distortion.

2. The imaging device of claim 1, further comprising:
   a data storage unit configured to store the generated image data and the image correction parameters.

3. The imaging device of claim 1, wherein the distortion is caused by at least one of electrical crosstalk, spectral crosstalk, optical crosstalk, and radial fall-off.

4. The imaging device of claim 1, wherein the first space formatted image data is Bayer space formatted image data.

5. The imaging device of claim 1, wherein the processing unit comprises:
   a balance unit configured to identify color temperatures in the image data; and
   an approximation unit configured to identify a closest color temperature corresponding to one or more of the image correction parameters that are stored in a data storage unit.

6. The imaging device of claim 1, wherein the processing unit comprises:
   a sharpening unit configured to sharpen an effective sensor response for each color channel; and
   a radial fall-off unit configured to correct radial fall-off distortion and optical crosstalk in each color channel.

7. The imaging device of claim 6, wherein the image correction parameters include:
   a sensor response sharpening matrix that is used by the sharpening unit to sharpen the effective sensor response for each color channel.

8. The imaging device of claim 6, wherein the image correction parameters include:
   radial fall-off correction parameters that are used by the radial fall-off unit to correct the radial fall-off distortion and optical crosstalk in each color channel.

9. The imaging device of claim 1, wherein the processing unit comprises:
   a de-convolution unit configured to correct radial fall-off distortion and optical crosstalk in each color channel.

10. The imaging device of claim 9, wherein the image correction parameters include:
    de-convolution coefficients that are used by the de-convolution unit to correct the radial fall-off distortion and optical crosstalk in each color channel.

11. A method for an imaging device to reduce a distortion, the method comprising:
    generating image data containing a plurality of color channels;
    converting, by a processor, the image data from a first space formatted image data to R, $G_1$, $G_2$, B data prior to a reduction of the distortion;
    reducing the distortion from the converted R, $G_1$, $G_2$, B data based on a plurality of image correction parameters; and
    converting back the converted R, $G_1$, $G_2$, B data to the first space formatted image data after the reduction of the distortion.

12. The method of claim 11, further comprising:
    storing the generated image data and the image correction parameters in a data storage unit.

13. The method of claim 11, wherein the distortion is caused by at least one of electrical crosstalk, spectral crosstalk, optical crosstalk, and radial fall-off.

14. The method of claim 11, wherein the first space formatted image data is Bayer space formatted image data.

15. The method of claim 11, further comprising:
identifying color temperatures in the image data; and
identifying a closest color temperature corresponding to one or more of the image correction parameters that are stored in a data storage unit.

16. The method of claim 11, further comprising:
sharpening an effective sensor response for each color channel; and
correcting radial fall-off distortion and optical crosstalk in each color channel.

17. The method of claim 16, wherein the sharpening the effective sensor response comprising:
sharpening the effective sensor response for each color channel with sharpening matrix included in the image correction parameters.

18. The method of claim 16, wherein the sharpening the effective sensor response comprising:
sharpening the effective sensor response to correct the radial fall-off distortion and optical crosstalk in each color channel with radial fall-off correction parameters included in the image correction parameters.

19. The method of claim 11, further comprising:
correcting radial fall-off distortion and optical crosstalk in each color channel.

20. The method of claim 19, wherein the correcting the radial fall-off distortion and optical crosstalk comprising:
correcting the radial fall-off distortion and optical crosstalk in each color channel with de-convolution coefficients included in the image correction parameters.

* * * * *